(12) United States Patent
Han

(10) Patent No.: US 11,978,170 B2
(45) Date of Patent: May 7, 2024

(54) DATA PROCESSING METHOD, COMPUTER DEVICE AND READABLE STORAGE MEDIUM

(71) Applicant: Tencent Technology (Shenzhen) Company Limited, Shenzhen (CN)

(72) Inventor: Rui Han, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/210,497

(22) Filed: Jun. 15, 2023

(65) Prior Publication Data
US 2023/0326152 A1 Oct. 12, 2023

Related U.S. Application Data

(63) Continuation of application No. PCT/CN2022/107186, filed on Jul. 21, 2022.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/167* (2013.01);
(Continued)

(58) Field of Classification Search
CPC .... G06F 3/011; G06F 16/9038; G06T 19/006; G06T 7/70; G06T 7/73; G06T 7/50;
(Continued)

(56) References Cited

U.S. PATENT DOCUMENTS

2009/0030800 A1  1/2009 Grois et al.
2018/0349703 A1* 12/2018 Rathod .................. A63F 13/65
(Continued)

FOREIGN PATENT DOCUMENTS

CN        101300621    *  1/2006  .......... G06F 3/0482
CN        101031866 A     9/2007
(Continued)

OTHER PUBLICATIONS

International Search Report with English Translation and Written Opinion, dated Oct. 12, 2023, pp. 1-10, issued in International (PCT) Application No. PCT/CN2022/107186, China Intellectual Property Administration, Beijing, China.

*Primary Examiner* — Nelson M Rosario
*Assistant Examiner* — Scott D Au
(74) *Attorney, Agent, or Firm* — Crowell & Moring LLP

(57) ABSTRACT

A data processing method and apparatus, a computer device, a readable storage medium, and a computer program product are provided. The method includes: displaying a shot picture in a shooting interface, the shot picture being captured by a shooting component and including a target object; displaying a first virtual rendering area of the target object in the shooting interface in response to a first trigger operation for the target object in the shooting interface; and displaying media data in the first virtual rendering area, the media data being associated with an object classification of the target object.

19 Claims, 24 Drawing Sheets

(51) Int. Cl.
*G06F 3/16* (2006.01)
*G06F 16/9038* (2019.01)
*G06T 7/13* (2017.01)
*G06T 7/50* (2017.01)
*G06T 7/73* (2017.01)
*G06V 10/44* (2022.01)
*G06V 10/764* (2022.01)
*G06V 10/80* (2022.01)
*G06V 30/18* (2022.01)

(52) U.S. Cl.
CPC ............ *G06F 16/9038* (2019.01); *G06T 7/13* (2017.01); *G06T 7/50* (2017.01); *G06T 7/73* (2017.01); *G06V 10/44* (2022.01); *G06V 10/764* (2022.01); *G06V 10/806* (2022.01); *G06V 30/1801* (2022.01); *G06T 2200/24* (2013.01)

(58) Field of Classification Search
CPC ........ G06T 7/13; G06V 10/764; G06V 20/20; G06V 10/806; G06V 10/44; G06V 30/1801

See application file for complete search history.

(56) References Cited

U.S. PATENT DOCUMENTS

| | | | |
|---|---|---|---|
| 2019/0026950 | A1 | 1/2019 | Sawaki et al. |
| 2020/0027236 | A1* | 1/2020 | Tamama .............. G06F 3/04815 |
| 2020/0089316 | A1* | 3/2020 | Raskar .................... G06F 3/011 |
| 2020/0226383 | A1* | 7/2020 | Meier ..................... G06V 10/17 |

FOREIGN PATENT DOCUMENTS

| | | | | |
|---|---|---|---|---|
| CN | 108345667 | A | 7/2018 | |
| CN | 111314759 | A | 6/2020 | |
| CN | 113012299 | A | 6/2021 | |
| CN | 113778547 | * | 12/2021 | ............. G06F 9/451 |
| WO | WO2019171128 | A | 9/2019 | |

* cited by examiner

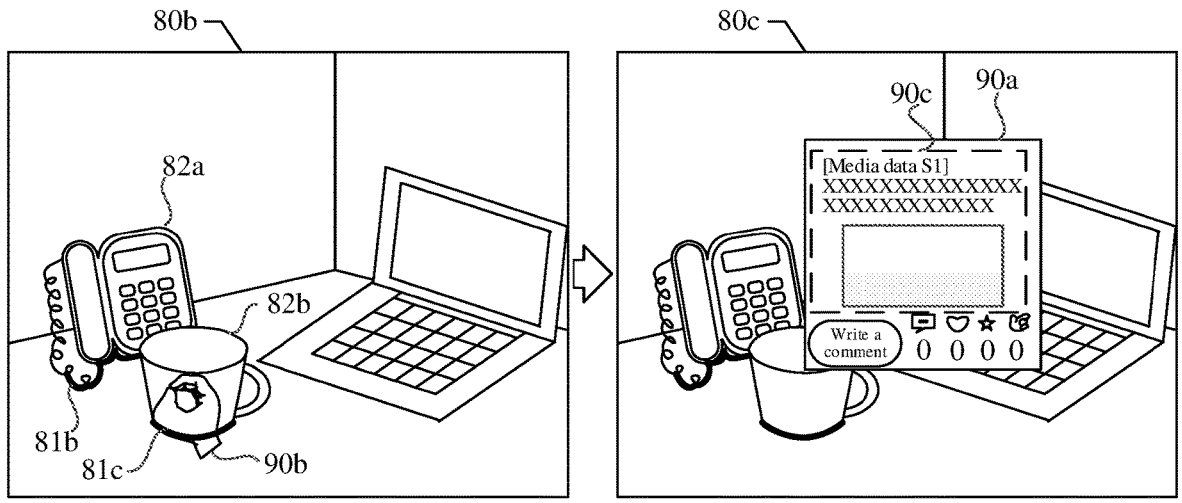

FIG. 9

| Display a virtual model object having a same shape as a target object in a shooting interface in response to a modeling operation for the target object in the shooting interface | S301 |

↓

| Display the virtual model object at a virtual position in the shooting interface in response to a transformation operation for the virtual model object in the shooting interface | S302 |

FIG. 10

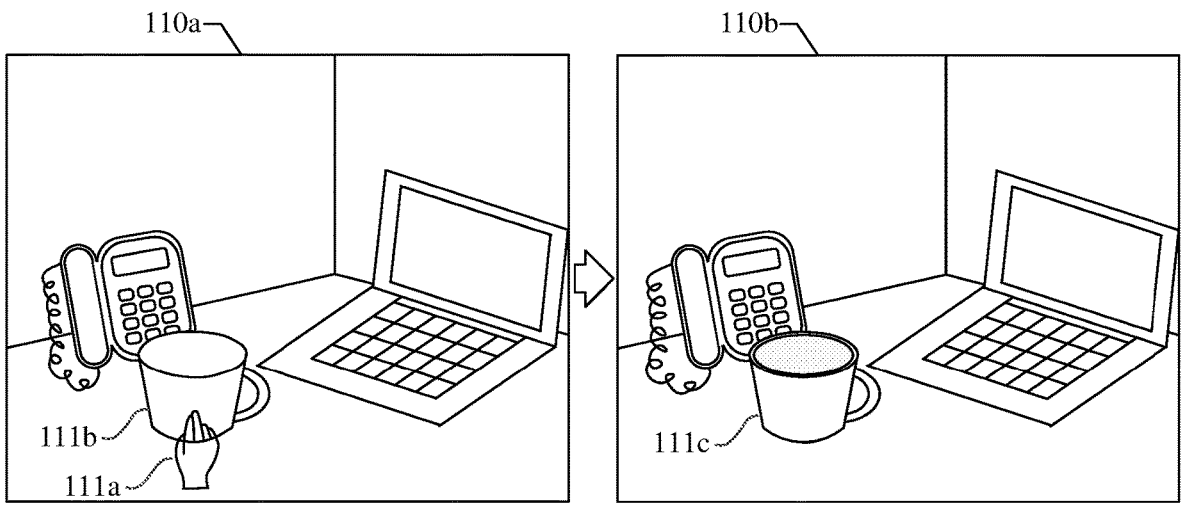

FIG. 11

DATA PROCESSING METHOD, COMPUTER DEVICE AND READABLE STORAGE MEDIUM

CROSS-REFERENCE TO RELATED APPLICATIONS

This application claims priority as a continuation of PCT/CN2022/107186, filed on Jul. 21, 2022, which claims priority to Chinese Patent Application No. 202210100378.3 filed on Jan. 27, 2022, wherein the entirety of each is hereby incorporated herein by reference.

FIELD OF THE TECHNOLOGY

This application relates to the field of computer technology, and in particular, to a data processing method, a computer device, a readable storage medium, and a computer program product.

BACKGROUND OF THE DISCLOSURE

An augmented reality (AR) device can superimpose a rendered virtual scene on a real scene (namely, a shot picture) captured by a local camera. The superimposed picture can then be presented to the AR device.

AR superimposes a virtual scene (i.e., a scene that does not exist in the captured space-time) on the captured real scene. In order to meet the user's requirement for understanding relevant information about some objects therein during the viewing process, the related art adopts a method of pre-implanting the relevant information in the shot picture. Since such a method cannot adapt to the individual requirements of different users, the relevant information may not be displayed accurately. Besides, due to the implantation of a large amount of the relevant information, the data transmission time and storage cost of AR increase.

SUMMARY

Embodiments of this application provide a data processing method and apparatus, a computer device and readable storage medium, and a computer program product. Then the display of media data can be accurately controlled in an AR scene.

In one aspect, a data processing method, applied to a computer device having one or more processors and memory storing programs to be executed by the one or more processors is described, including:
  displaying a shot picture in a shooting interface, the shot picture being captured by a shooting component and including a target object;
  displaying a first virtual rendering area of the target object in the shooting interface in response to a first trigger operation for the target object in the shooting interface; and
  displaying media data in the first virtual rendering area, the media data being associated with an object classification of the target object.

In another aspect, a data processing apparatus is described, including:
  a picture display module, configured to display a shot picture in a shooting interface, the shot picture being captured by a shooting component and including a target object;
  an area display module, configured to display a first virtual rendering area of the target object in the shooting interface in response to a first trigger operation for the target object in the shooting interface; and
  a data display module, configured to display media data in the first virtual rendering area, the media data being associated with an object classification of the target object.

In another aspect, a computer device has one or more processors, memory coupled to the one or more processors and a plurality of programs stored in the memory that, when executed by the one or more processors, cause the computer device to perform the data processing method.

In another aspect, an embodiment of this application provides a non-transitory computer-readable storage medium, storing a computer program therein, the computer program being loaded and executed by a processor to cause a computer device having the processor to perform the method provided in embodiments of this application.

In another aspect, a computer program product and a computer program are described, the computer program product or the computer program including a computer instruction stored in a computer-readable storage medium. The processor of the computer device reads the computer instruction from the computer-readable storage medium, and the processor executes the computer instruction to cause the computer device to perform the method provided in the embodiment of this application.

In the embodiments of this application, when a shot picture in a shooting interface is captured by a shooting component, a target object in the shot picture indicated by a first trigger operation is determined, and then media data associated with an object classification of the target object is displayed in a first virtual rendering area of the target object. In addition, media data associated with the target object is accurately displayed in the first virtual rendering area by the trigger operation. As a result, the accuracy of the media data improves, and pre-implanting a large amount of media data unrelated to the target object is avoided, thereby reducing the data transmission time and storage cost of AR.

BRIEF DESCRIPTION OF THE DRAWINGS

FIG. 9 is a schematic illustration of a scene for viewing a hyperobject link provided in an embodiment of this application.

FIG. 10 is a flowchart of a data processing method provided in an embodiment of this application.

FIG. 11 is a schematic illustration of a scene for performing modeling processing provided in an embodiment of this application.

DESCRIPTION OF EMBODIMENTS

In conjunction with the drawings in the embodiments of this application, the technical solutions of the embodiments of this application will be clearly and completely described below. It is apparent that the embodiments described are only some, but not all embodiments of this application. Other embodiments can be obtained by those skilled in the art based on the embodiments of this application without creative work, which fall within the scope of protection of this application.

The embodiments of this application relate to artificial intelligence (AI). AI is a theory, method, technology, and application system that utilizes a digital computer or a machine controlled by the digital computer to simulate, extend and expand human intelligence, perceive the environment, and acquire knowledge and use the knowledge to obtain optimal results. In other words, AI is a comprehensive technology of computer science. It attempts to understand the nature of intelligence and produce a new intelligent machine that reacts in a manner similar to human intelligence. AI is to study the design principles and implementations of various intelligent machines to enable the machines to have the functions of perception, reasoning, and decision-making.

AI technology is a comprehensive subject and involves a wide range of fields, including both hardware-level technology and software-level technology. The basic technologies of AI generally include technologies such as a sensor, a special AI chip, cloud computing, distributed storage, big data processing technology, operation/interaction system, and electromechanical integration. AI software technology mainly includes several major aspects of computer vision technology, voice processing technology, natural language processing technology, machine learning/deep learning, automatic driving, and intelligent transportation.

AR technology is a new human-computer interaction technology. The AR technology can recognize objects, planes, human faces and the like in the current environment, and superimpose virtual information on the basis of the current environment, i.e., superimposing a real scene (namely, a shot picture) captured by a local camera and the rendered virtual scene. Then the superimposed picture is presented to the AR device. The AR device can update the rendered virtual scene in response to a trigger operation for the virtual scene and then display the updated virtual scene in the real scene. The virtual information may include a simple user interface (UI) and may also include additional information (for example, media data in a first virtual rendering area and a media presentation content in a second virtual rendering area involved in an embodiment of this application).

Figure 1:
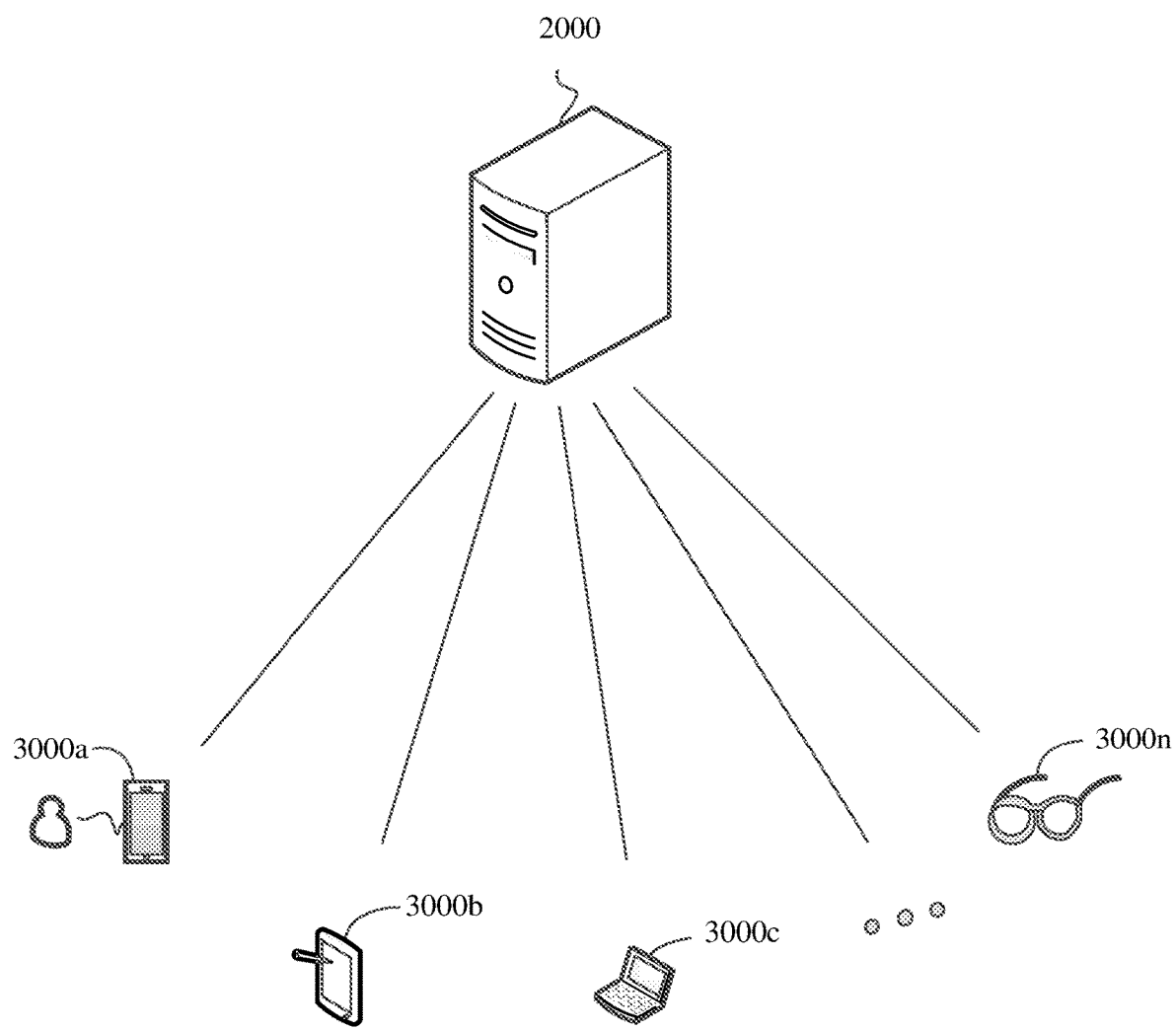
FIG. 1 is a schematic structural diagram of a network architecture provided in an embodiment of this application.

Reference may be made to FIG. 1. FIG. 1 is a schematic structural diagram of a network architecture provided in an embodiment of this application. As shown in FIG. 1, the network architecture may include a business server 2000 and a cluster of terminal devices. The cluster of terminal devices may include one or more terminal devices, and the number of the terminal devices in the cluster of terminal devices is not defined herein. As shown in FIG. 1, a plurality of the terminal devices may include a terminal device 3000a, a terminal device 3000b, a terminal device 3000c . . . , and a terminal device 3000n. The terminal device 3000a, the terminal device 3000b, the terminal device 3000c . . . , and the terminal device 3000n can directly or indirectly make a network connection with the business server 2000 separately by wired or wireless communications. As such, each terminal device can perform data interaction with the business server 2000 by the network connection.

It is appreciated that in an AR scene, each terminal device in the cluster of terminal devices shown in FIG. 1 is a computer device having the AR functions. Each terminal device in the cluster of terminal devices may include intelligent terminals having data processing function, such as a wearable device, smart phone, tablet, notebook computer, desktop computer, smart home, and vehicle-mounted terminal. It is understood that the application scenes of the embodiments of this application may include, but are not limited to, AR scenes.

To facilitate understanding, the embodiments of this application may select one terminal device among the plurality of the terminal devices shown in FIG. 1 as a target terminal device. For example, an embodiment of this application may use the terminal device 3000n shown in FIG. 1 as the target terminal device. The target terminal device can perform data interaction with the business server 2000. A shooting component for acquiring a shot picture can be integrally installed on the target terminal device, and the shooting component herein can be a camera for shooting on the target terminal device.

The business server 2000 shown in FIG. 1 may be an independent physical server, or may be a server cluster or a distributed system of a plurality of the physical servers, or may be a cloud server providing basic cloud computing services, such as cloud service, cloud database, cloud computing, cloud function, cloud storage, network service, cloud communication, middleware service, domain name service, CDN, and big data and AI platforms.

To facilitate understanding, in the embodiments of this application, an object (i.e., a target) needing to be performed search processing selected by a certain interactive object (e.g., an object Y) in a shot picture may be collectively referred to as a target object. To facilitate understanding, in the embodiments of this application, a content recommended to a certain interactive object (e.g., the object Y) may be collectively referred to as media data, and a content (e.g., video data, graphic data, and application data) selected by a certain interactive object (e.g., the object Y) to meet his own interest in the media data may be collectively referred to as target media data.

The media data in the embodiments of this application may be the video data, or may be graphic data, or may be application data. The type of the media data is not defined in the embodiments of this application. It is understood that the business scenes to which the above network framework applies may include: an entertainment program on-demand scene, an on-line news reading scene, and an on-line item purchasing scene. The network framework can implement the search processing for a target object under the business scenes, including the entertainment program on-demand scene, the on-line news reading scene, and the on-line item purchasing scene. The business scenes to which the network framework applies will not be listed one by one herein. For example, in the entertainment program on-demand scene, the media data in the embodiments of this application may be the video data, and the video data herein may be an entertainment program associated with the target object obtained after performing the search processing on an object classification of the target object (namely, a category to which the target object belongs). For another example, in the on-line news reading scene, the media data in the embodiments of this application may be the graphic data, and the graphic data herein may be a news article associated with the target object obtained after performing the search processing on the object classification of the target object. For another example, in the on-line item purchasing scene, the media data in the embodiments of this application may be the application data. The application data herein may be a shopping client associated with the target object obtained after performing the search processing on the object classification of the target object, and the shopping client may display the amount of money required to purchase the target object.

It is understood that an interactive object (e.g., the object Y) can be shot by a shooting component in a shooting interface to obtain a shot picture. One or more objects in the shot picture can be recognized by performing object recognition on the shot picture. When the object Y needs to perform the search processing on a target object in the one or more objects, the object Y can perform a trigger operation (e.g., a gesture operation) on the target object in the shooting interface. The shot picture may be a real-time picture presented by the open shooting component, a picture when video recording is performed by the shooting component, and the like. The object recognition is fundamental research in the field of computer vision. Its task is to recognize an object in an image and to determine the position and orientation of this object in a scene represented by the image. In this way, the terminal device can recognize and obtain the object classification of the target object in response to the gesture operation for the target object, display a virtual rendering area of the target object in the shooting interface, and further display at least one piece of media data associated with the object classification of the target object in the virtual rendering area. Namely, the category of at least one piece of the associated media data is consistent with the object classification of the target object. As such, the object Y can select the target media data meeting its own interest among one or more pieces of media data.

Figure 2:
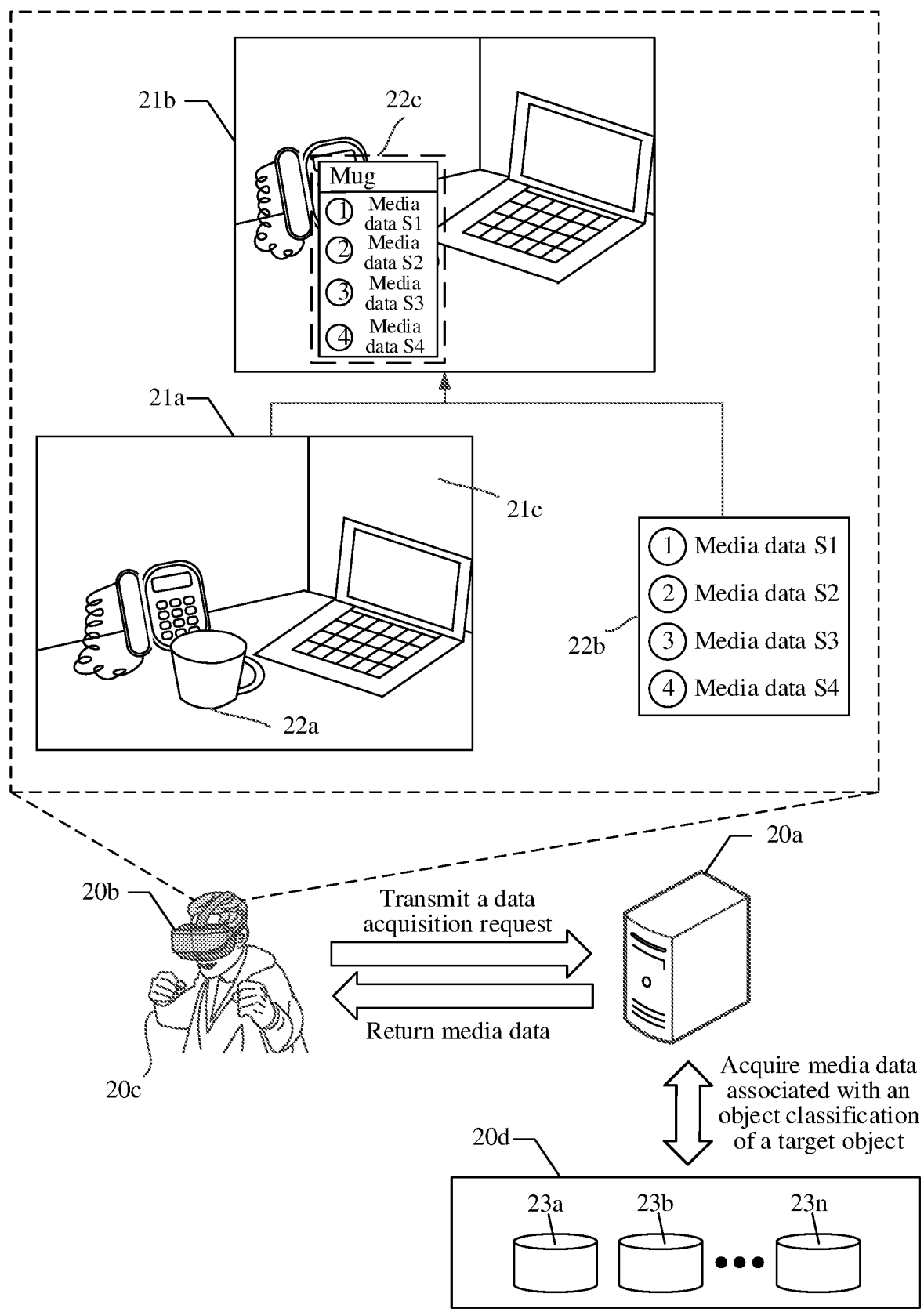
FIG. 2 is a schematic illustration of a scene for performing data interaction provided in an embodiment of this application.

To facilitate understanding, reference may be made to FIG. 2. FIG. 2 is a schematic illustration of a scene for performing data interaction provided in an embodiment of this application. A server 20a as shown in FIG. 2 may be the business server 2000 in the embodiment corresponding to the above FIG. 1, and a terminal device 20b as shown in FIG. 2 may be any terminal device in the cluster of terminal devices in the embodiment corresponding to the above FIG. 1. To facilitate understanding, the embodiment of this application takes an example that the terminal device 3000n as shown in FIG. 1 is taken as the terminal device 20b to explain the specific process of performing data interaction between the terminal device 20b and the server 20a as shown in FIG. 2. The interactive object corresponding to the terminal device 20b may be an interactive object 20c.

As shown in FIG. 2, the interactive object 20c may be shot by a shooting component integrated on the terminal device 20b to display a shot picture 21c in a shooting interface 21a of the terminal device 20b. The shot picture 21c may include at least one object, and at least one object includes an object 22a shown in FIG. 2. When the terminal device 20b is a wearable device, the shooting component may be a camera on AR glasses.

As an example, if the interactive object 20c needs to perform search processing on the object 22a, a trigger operation (e.g., the first trigger operation) may be performed on the object 22a, the object 22a is recognized as a target object, and a data acquisition request is transmitted to the server 20a by the terminal device 20b. The data acquisition request herein is transmitted by the terminal device 20b based on the shot picture 21c and the first trigger operation, and the data acquisition request includes the shot picture 21c and the first trigger operation. The first trigger operation herein may include a contact operation such as clicking, long pressing and sliding and may also include a non-contact operation such as voice and gesture, which are not defined in the embodiments of this application.

As an example, the shot picture 21c is displayed in the shooting interface 21a. The shot picture 21c includes at least one object, and the target object is automatically recognized from the at least one object according to a recognition condition. The recognition condition includes at least one of the following: the position and size of the object in the shot picture. For example, the object with the largest size in the shot picture 21c is recognized as the target object, and the object located at the geometric center of the shot picture 21c is recognized as the target object.

It is understood that when the first trigger operation is the gesture operation, the specific type of the gesture operation is not defined in the embodiments of this application. It can be understood that the gesture recognition refers to understanding the behavior of the interactive object by the computer vision to enable the interactive object to control the virtual scene by gestures. As such, the interaction between the interactive object and the virtual scene can be realized, thereby improving the user experience of the interactive object. It can be understood that the interactive object 20c can also perform a gesture input operation for the shooting interface 21a. As such, the terminal device 20b can acquire an input gesture corresponding to the gesture input operation, and then transmit the data acquisition request to the server 20a when the first trigger operation is the input gesture.

As shown in FIG. 2, after receiving the data acquisition request, the server 20a may acquire the object 22a pointed to by the first trigger operation from the shot picture 21c, determine the object 22a as the target object, perform the search processing on the target object, and acquire the media data associated with the object classification of the target object from a content database 20d. The content database 20d may include a plurality of media databases, and the plurality of media databases may include: a media database 23a, a media database 23b . . . , a media database 23n. The media database 23a, the media database 23b . . . , the media database 23n may be used for storing media data of different object classifications. For example, the media database 23a may be used for storing media data associated with an object classification $D_1$, the media database 23b may be used for storing media data associated with an object class $D_2$ . . . , and the media database 23n may be used for storing media data associated with an object class $D_1$.

For example, when the object classification of the object 22a is $D_1$, a search result obtained after performing search processing on the object 22a may be the media database 23a. Then the server 20a may acquire the media database 23a from the content database 20d, and further acquire the media data for being recommended to the terminal device 20b from the media data of the media database 23a. The media data for being recommended to the terminal device 20b may be a media data 22b, and the number of the media data 22b may be multiple. The differences between the media data for being recommended to the terminal device 20b include at least one of the following: the content of the media data, the modality of the media data, and the data size of the media data. Taking the number of the media data 22b being 4 as an example, the 4 pieces of media data are: media data $S_1$, media data $S_2$, media data $S_3$, and media data $S_4$. For example, the modality of the media data $S_1$ is the graphic data, and the modality of the media data $S_2$ is the video data. It can be understood that the server 20a, when acquiring the media data $S_1$, the media data $S_2$, the media data $S_3$ and the media data $S_4$, can determine the order of the media data $S_1$, the media data $S_2$, the media data $S_3$ and the media data $S_4$, and then recommend the order of the media data as well as the media data $S_1$, the media data $S_2$, the media data $S_3$ and the media data $S_4$ to the terminal device 20b.

As shown in FIG. 2, after receiving the media data 22b returned by the server 20a, the terminal device 20b may display a virtual rendering area 22c (namely, the first virtual rendering area 22c) of the object 22a in the shooting interface 21a, and then display the media data 22b in the virtual rendering area 22c based on the order of the media data 22b. For example, the media data $S_1$ may be the first, the media data $S_2$ may be the second, the media data $S_3$ may be the third, and the media data $S_4$ may be the fourth.

For example, the terminal device 20b may further display the object classification of the object 22a together with the media data 22b associated with the object classification of the object 22a in the virtual rendering area 22c. The object classification of the object 22a is an object classification $D_1$, and the object classification $D_1$ herein may be a "mug". At this time, the terminal device 20b may switch the shooting interface 21a to a shooting interface 21b, that is, the shooting interface 21a and the shooting interface 21b may be shooting interfaces of the terminal device 20b at different times.

The virtual rendering area 22c may be located at any position in the shooting interface 21a. In general, the virtual rendering area 22c may be located at the position in which the object 22a is located. Namely, the virtual rendering area 22c is superimposed and displayed on the object 22a, or the virtual rendering area 22c is displayed next to the object 22a. Accordingly, the display position of the media data 22b is located at the position in which the object 22a is located. Besides, the virtual rendering area 22c may be displayed by blocking the shot picture 21c or may be displayed by adjusting the transparency.

It can be understood that the virtual rendering area 22c may include one or more presentation cards, and the number of presentation cards is not defined in the embodiments of this application. In addition, it is understood that FIG. 2 is illustrated by taking an example that the virtual rendering area 22c may include one presentation card. When the virtual rendering area 22c includes one presentation card, the terminal device 20b may present the media data 22b in one presentation card; when the virtual rendering area 22c includes a plurality of presentation cards, the terminal device may present the media data 22b in the plurality of presentation cards.

The data processing method provided in the embodiments of this application may be implemented jointly by the server and the terminal device, as shown in FIG. 2, and may also be implemented by the terminal device. For example, the shot picture is displayed in the shooting interface of the terminal device 20b. If the interactive object 20c needs to perform the search processing on the object 22a, the trigger operation (for example, the first trigger operation) for the object 22a can be performed. The terminal device 20b automatically generates the data acquisition request; the terminal device 20b acquires the object 22a pointed to by the first trigger operation from the shot picture 21c based on the data acquisition request, determines the object 22a as the target object, and then performs the search processing on the target object. In addition, the terminal device acquires the media data associated with the object classification of the target object from the content database 20d of the terminal device 20b itself, displays the virtual rendering area 22c (namely, the first virtual rendering area 22c) of the object 22a in the shooting interface 21a based on the media data 22b, and then displays the media data 22b in the virtual rendering area 22c based on the order of the media data 22b.

It can be seen therefrom that in the embodiments of this application, in a case that the shot picture including the target object is displayed in the shooting interface, the search processing may be performed on the target object in response to the first trigger operation for the target object, and the first virtual rendering area of the target object may be generated, thereby increasing the interaction mode of the computer device. The first virtual rendering area may be used for displaying the media data obtained after performing the search processing on the target object. The media data herein is the media data associated with the interactive object, and the media data acquired by different interactive objects is different. Furthermore, for the first trigger operation for different objects in the shot picture, the first virtual rendering area of the different objects is displayed in the shooting interface, thereby increasing the presentation way of the computer device.

Figure 3:
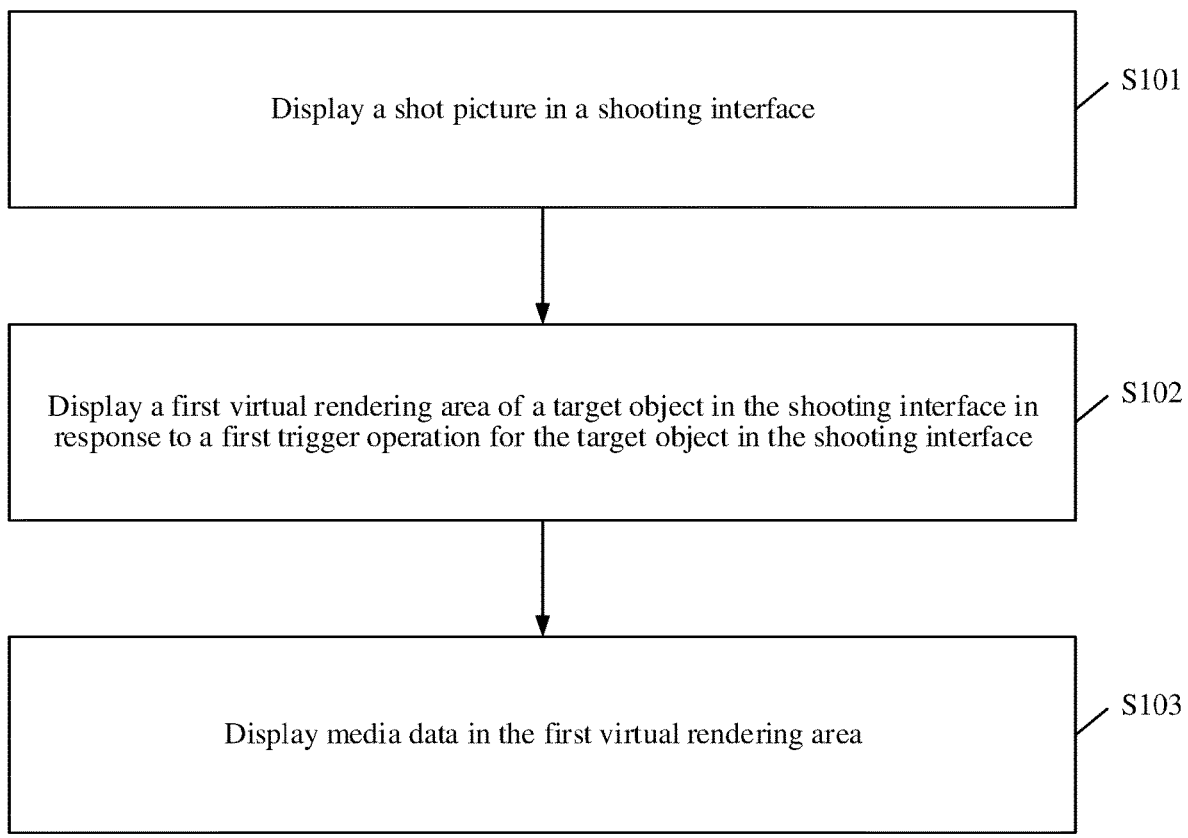
FIG. 3 is a flowchart of a data processing method provided in an embodiment of this application.

Reference may be made to FIG. 3. FIG. 3 is a flowchart of a data processing method provided in an embodiment of this application. The method may be performed by a server, a terminal device, or both the server and the terminal device. The server may be the server $20a$ in the embodiment corresponding to FIG. 2, and the terminal device may be the terminal device $20b$ in the embodiment corresponding to FIG. 2. To facilitate understanding, the embodiments of this application are described by taking the method performed by the terminal device as an example. The data processing method may include the following steps S101-S103.

Step S101: Display a shot picture in a shooting interface.

The shot picture is captured by a shooting component and includes at least one object. The at least one object includes a target object.

The shot picture may be a real-time picture presented by the open shooting component, a picture when video recording is performed by the shooting component, and the like. The shooting component may be a component configured to shoot provided by the terminal device itself or a component configured to shoot integrated by other computer devices. When the shooting component is the component configured to shoot integrated by other computer devices, the component configured to shoot integrated by other computer devices captures the shot picture and then transmits the shot picture to the terminal device so as to display the shot picture in the shooting interface of the terminal device.

The shooting interface is a human-computer interaction interface for displaying the shot picture.

It can be understood that when an interactive object corresponding to the terminal device (for example, the interactive object $20c$ in the embodiment corresponding to FIG. 2) needs to start the shooting component in the terminal device, a starting operation may be performed for the shooting component. As such, the terminal device can start the shooting component in the terminal device in response to the starting operation performed by the interactive object for the shooting component, shoot the real scene by the shooting component, and display the shot picture in the shooting interface of the terminal device.

Step S102: Display a first virtual rendering area of a target object in the shooting interface in response to a first trigger operation for the target object in the shooting interface.

For example, the terminal device may acquire a target position of the target object in the shooting interface in response to the first trigger operation for the target object in the shooting interface. The terminal device may display the first virtual rendering area of the target object in the shooting interface in a focus presentation way when the target position is located in a focus area in the shooting interface. The terminal device may display the first virtual rendering area of the target object in the shooting interface in a non-focus presentation way when the target position is not located in the focus area in the shooting interface.

The focus area represents an area located in a middle area of the shooting interface (including an area at a geometric center of the shooting interface, for example, including a circular area, a square area, and the like at the geometric center of the shooting interface), and the non-focus position may represent a position located in a non-middle area of the shooting interface. The middle area and the non-middle area may be set manually. For example, the terminal device may set 60% of the area at the middle of the shooting interface as the middle area and 40% of the surrounding area of the shooting interface as the non-middle area.

It can be understood that the terminal device can acquire an auxiliary instruction trajectory for triggering to display the first virtual rendering area, and perform similarity determination on the auxiliary instruction trajectory and the trigger trajectory corresponding to the first trigger operation. The auxiliary instruction trajectory may be the shape of "?". When the auxiliary instruction trajectory and the trigger trajectory satisfy a trajectory similarity condition (namely, the similarity between the auxiliary instruction trajectory and the trigger trajectory is greater than a similarity threshold value), the terminal device performs the step of displaying the first virtual rendering area of the target object in the shooting interface. When the auxiliary instruction trajectory and the trigger trajectory do not satisfy the trajectory similarity condition (namely, the similarity between the auxiliary instruction trajectory and the trigger trajectory is less than or equal to the similarity threshold value), the terminal device does not need to perform any steps.

It is understood that the terminal device may determine that the number of cards of presentation cards (i.e., AR cards) of the target object is M during responding to the first trigger operation for the target object in the shooting interface. The number of cards M is determined based on the media number of the media data. For example, the card data is the media number of the media data, or the number of cards is the ratio of the media number of the media data to the media number of the media data that can be carried by one presentation card, where the M may be a positive integer. The terminal device may determine the M presentation cards as the first virtual rendering area of the target object and display the first virtual rendering area in the shooting interface. The M presentation cards have a predefined priority.

The presentation cards, a kind of card simulating a pattern of a real card, are used for occupying a partial area in the shooting interface to carry the media data of the target object. As such, the media data of the target object is avoided to be mixed together, thereby displaying the media data of the target object more clearly.

The display parameters distinguishing the focus presentation way from the non-focus presentation way include at least one of the following: the number of cards and the card shape. The number of cards and the card shape are described below.

It can be understood that the terminal device can acquire the media data associated with the object classification of the target object when the target position is located at the focus position in the shooting interface. The media data is obtained after performing the search processing on the object classification of the target object, and the object classification is obtained after performing classification processing on the target object. The terminal device may determine that the number of cards indicated by the focus presentation way is one (namely, M is equal to 1) and determine one presentation card as the first virtual rendering area of the target object. The terminal device may determine that the number of cards indicated by the focus presentation way is at least two (namely, M is a positive integer greater than 1) and determine at least two presentation cards as the first virtual rendering area of the target object. It is understood that the embodiments of this application are described by taking the focus presentation way corresponding to one presentation card as an example.

It can be understood that the terminal device can acquire the media data associated with the object classification of the target object when the target position is not located at the focus position in the shooting interface. The media data is obtained after performing the search processing on the object classification of the target object, and the object classification is obtained after performing classification processing on the target object. The terminal device may determine that the number of cards indicated by the non-focus presentation way is at least two (namely, M is a positive integer greater than 1) and display the first virtual rendering area of the target object in the shooting interface based on the number of at least two cards. The terminal device may determine that the number of cards indicated by the non-focus presentation way is one (namely, M is equal to 1) and display the first virtual rendering area of the target object in the shooting interface based on the number of one card. It is understood that the embodiments of this application are described by taking the non-focus presentation way corresponding to at least two presentation cards.

It is understood that the card shapes of the presentation cards corresponding to the focus presentation way and the non-focus presentation way separately may be different or the same. For example, the card shape corresponding to the focus presentation way may be a circle, and the card shape corresponding to the non-focus presentation way may be a triangle. To facilitate understanding, the embodiments of this application are described by taking an example that each of the card shapes corresponding to the focus presentation way and the non-focus presentation way is a rectangle.

For example, the embodiments of this application may also preset the presentation way of the presentation card. In this way, the terminal device may display the first virtual rendering area of the target object in the shooting interface in a preset presentation way in response to the first trigger operation for the target object in the shooting interface. The number of cards indicated by the preset presentation way may be one or at least two, which is not defined herein.

The embodiments of this application may perform the classification processing on the target object by an AI technology, for example, performing the classification processing on the target object by a neural network model for the object classification. The neural network model for the object classification is obtained by training based on the historical objects and annotation data of the historical object classification. The structural form of the neural network model for the object classification is not defined in the embodiments of this application, for example, the neural network model for the object classification may be a convolutional neural network model, a recurrent neural network model, a deep neural network model, and the like. The embodiments of this application may also perform the classification processing on the target object by a classic image recognition algorithm. For example, the classic image recognition algorithm may be a depth-first search algorithm, a breadth-first search algorithm, an A* search algorithm, and the like.

In some embodiments, the first trigger operation includes a voice trigger operation. In this way, the computer device may acquire audio data (namely, audio data indicated by the voice trigger operation) corresponding to the voice trigger operation in response to the voice trigger operation for the shooting interface and determine an object as the target object when there is the object matching voice text data indicated by the audio data in the shot picture (namely, there is the object consistent with the text description of the voice text data in the shot picture).

It can be understood that the computer device may perform voice recognition on the audio data to obtain the voice text data indicated by the audio data. For example, the voice text data may be a "notebook computer". Therefore, the computer device may determine an object consistent with the text description of the "notebook computer" in the shot picture as the target object. That is to say, the "notebook computer" in the shooting interface is determined as the target object.

Step S103: Display media data in the first virtual rendering area.

The media data is associated with the object classification of the target object. The media data herein is acquired by the terminal device after responding to the first trigger operation for the target object.

For example, when the first virtual rendering area includes at least two presentation cards, the terminal device may display the divided media data at equal amounts in each presentation card separately. Each presentation card separately displays different media data, and one presentation card is used for displaying at least one piece of media data. The embodiments of this application are described by taking an example that one presentation card is used for displaying one piece of media data, in a case that there are at least two presentation cards. For example, when the first virtual rendering area includes one presentation card, the terminal device may display the media data in one presentation card.

When the first virtual rendering area includes at least two presentation cards, the terminal device may display the divided media data at non-equal amounts in each presentation card separately. For example, when the first virtual rendering area includes two presentation cards, and there are three pieces of media data, then one piece of media data is displayed in a certain presentation card, and the other two pieces of media data are displayed in another presentation card.

It is understood that the embodiments of this application are described by taking an example that the media number of the media data associated with the object classification of the target object is at least two. When the number of media data is one, the non-focus presentation way corresponds to one presentation card, and the terminal device may determine one presentation card as the first virtual rendering area of the target object.

Figure 4A:
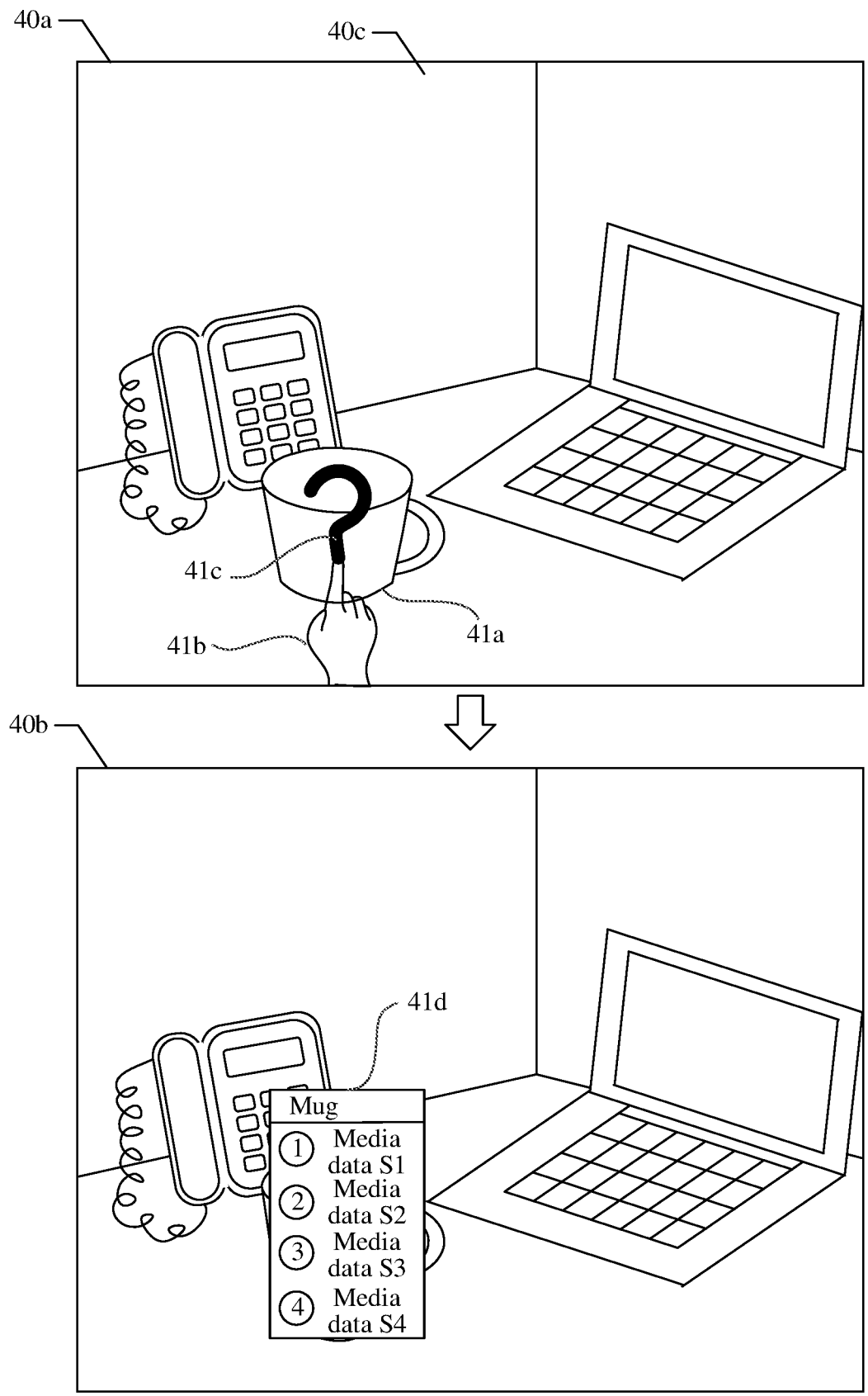
FIG. 4a is a schematic illustration of a scene for displaying one presentation card provided in an embodiment of this application.
Figure 4B:
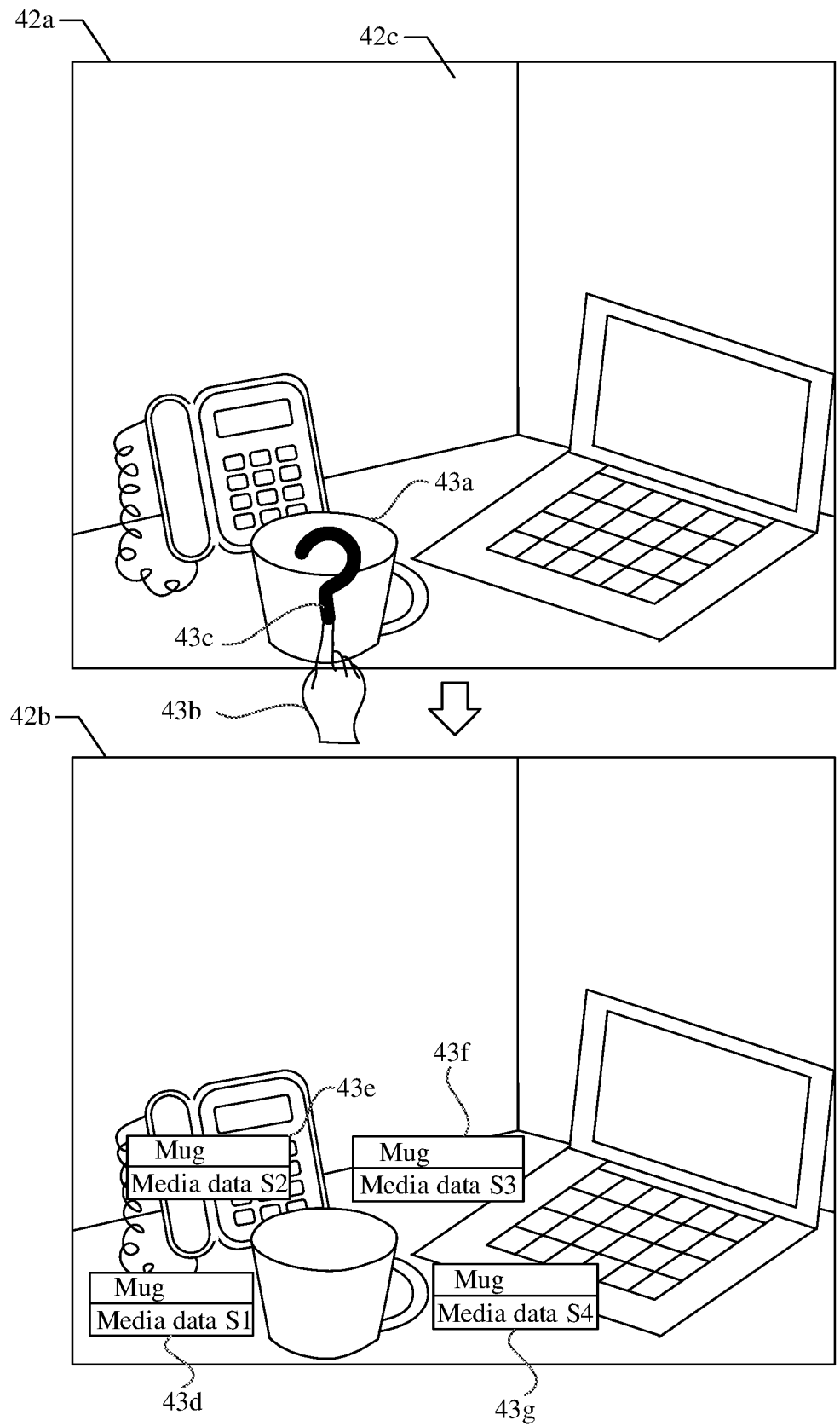
FIG. 4b is a schematic illustration of a scene for displaying at least two presentation cards provided in an embodiment of this application.

To facilitate understanding, the specific process that the terminal device displays the media data on one presentation card may refer to FIG. 4a. FIG. 4a is a schematic illustration of a scene for displaying one presentation card provided in an embodiment of this application. The specific process that the terminal device displays the media data on at least two presentation cards may refer to FIG. 4b. FIG. 4b is a schematic illustration of a scene for displaying at least two presentation cards provided in an embodiment of this application. A shooting interface 40a and a shooting interface 40b shown in FIG. 4a may be shooting interfaces of the terminal device at different times, and a shooting interface 42a and a shooting interface 42b shown in FIG. 4b may be shooting interfaces of the terminal device at different times. The shooting interface 42a shown in FIG. 4b may be the shooting interface 40a shown in FIG. 4a.

As shown in FIG. 4a, the shooting interface 40a of the terminal device may display a shot picture 40c captured by the shooting component, and the shot picture 40c may include a target object 41a that meets the interactive object's interest. The target object 41a herein may be a "mug" displayed in the shot picture 40c. Namely, the object classification of the target object 41a may be the "mug". It can be understood that when the interactive object needs to trigger the terminal device to perform the search processing on the target object 41a, the interactive object may perform the first trigger operation for the target object 41a. The first trigger operation herein may be a gesture operation 41b performed by the interactive object for the target object 41a.

In this way, the terminal device may acquire a trigger trajectory 41c corresponding to the gesture operation 41b in respond to the gesture operation 41b performed by the interactive object for the target object 41a, and perform similarity determination on the trigger trajectory 41c and the auxiliary instruction trajectory to obtain a similarity determination result. It can be understood that when the similarity determination result indicates that the trigger trajectory 41c and the auxiliary instruction trajectory satisfy a trajectory similarity condition (namely, the similarity between the auxiliary instruction trajectory and the trigger trajectory is greater than a similarity threshold value), the terminal device may display the first virtual rendering area of the target object 41a in the shooting interface 40a.

It can be understood that the terminal device may acquire a target position of the target object 41a in the shooting interface 40a. As shown in FIG. 4a, the target position is located in a focus area in the shooting interface 40a. Therefore, the terminal device may display a presentation card 41d of the target object 41a in the shooting interface 40a and determine the presentation card 41d as the first virtual rendering area of the target object 41a. The terminal device may display the first virtual rendering area in the shooting interface 40b, and the media data associated with the object classification (namely, "mug") of the target object 41a is displayed in the first virtual rendering area. The media data associated with the "mug" herein may be media data $S_1$, media data $S_2$, media data $S_3$, and media data $S_4$. Namely, the terminal device may display the media data $S_1$, the media data $S_2$, the media data $S_3$, and the media data $S_4$ in the presentation card 41d.

As shown in FIG. 4b, the shooting interface 42a of the terminal device may display a shot picture 42c captured by the shooting component, and the shot picture 42c may include a target object 43a that meets the interactive object's interest. The target object 43a herein may be a "mug" displayed in the shot picture 42c. Namely, the object classification of the target object 43a may be the "mug". It can be understood that when the interactive object needs to perform the search processing on the target object 43a, the interactive object may perform the first trigger operation for the target object 43a. The first trigger operation herein may be a gesture operation 43b performed by the interactive object for the target object 43a.

In this way, the terminal device may acquire a trigger trajectory 43c corresponding to the gesture operation 43b in respond to the gesture operation 43b performed by the interactive object for the target object 43a, and perform similarity determination on the trigger trajectory 43c and the auxiliary instruction trajectory to obtain a similarity determination result. It can be understood that when the similarity determination result indicates that the trigger trajectory 43c and the auxiliary instruction trajectory satisfy a trajectory similarity condition, the terminal device may display the first virtual rendering area of the target object 43a in the shooting interface 42a.

It can be understood that the terminal device may acquire a target position of the target object 43a in the shooting interface 42a. As shown in FIG. 4b, the target position is located in a non-focus area in the shooting interface 42a. Therefore, the terminal device may display a presentation card 43d, a presentation card 43e, a presentation card 43f and a presentation card 43g of the target object 43a in the shooting interface 42a, and determine the presentation card 43d, the presentation card 43e, the presentation card 43f and the presentation card 43g as the first virtual rendering area of the target object 43a. The terminal device may display the first virtual rendering area in the shooting interface 42b, and the media data associated with the object classification (namely, "mug") of the target object 43a is displayed in the first virtual rendering area. The media data associated with the "mug" herein may be media data $S_1$, media data $S_2$, media data $S_3$, and media data $S_4$. For example, the terminal device may display the media data $S_1$ in the presentation card 43d, the media data $S_2$ in the presentation card 43e, the media data $S_3$ in the presentation card 43f, and the media data $S_4$ in the presentation card 43g.

It is understood that the terminal device may display the second virtual rendering area of the target object in the shooting interface in response to a trigger operation for the media data in the first virtual rendering area. The terminal device may determine the media data pointed to by the trigger operation as target media data and display a media presentation content corresponding to the target media data in the second virtual rendering area.

Figure 5A:
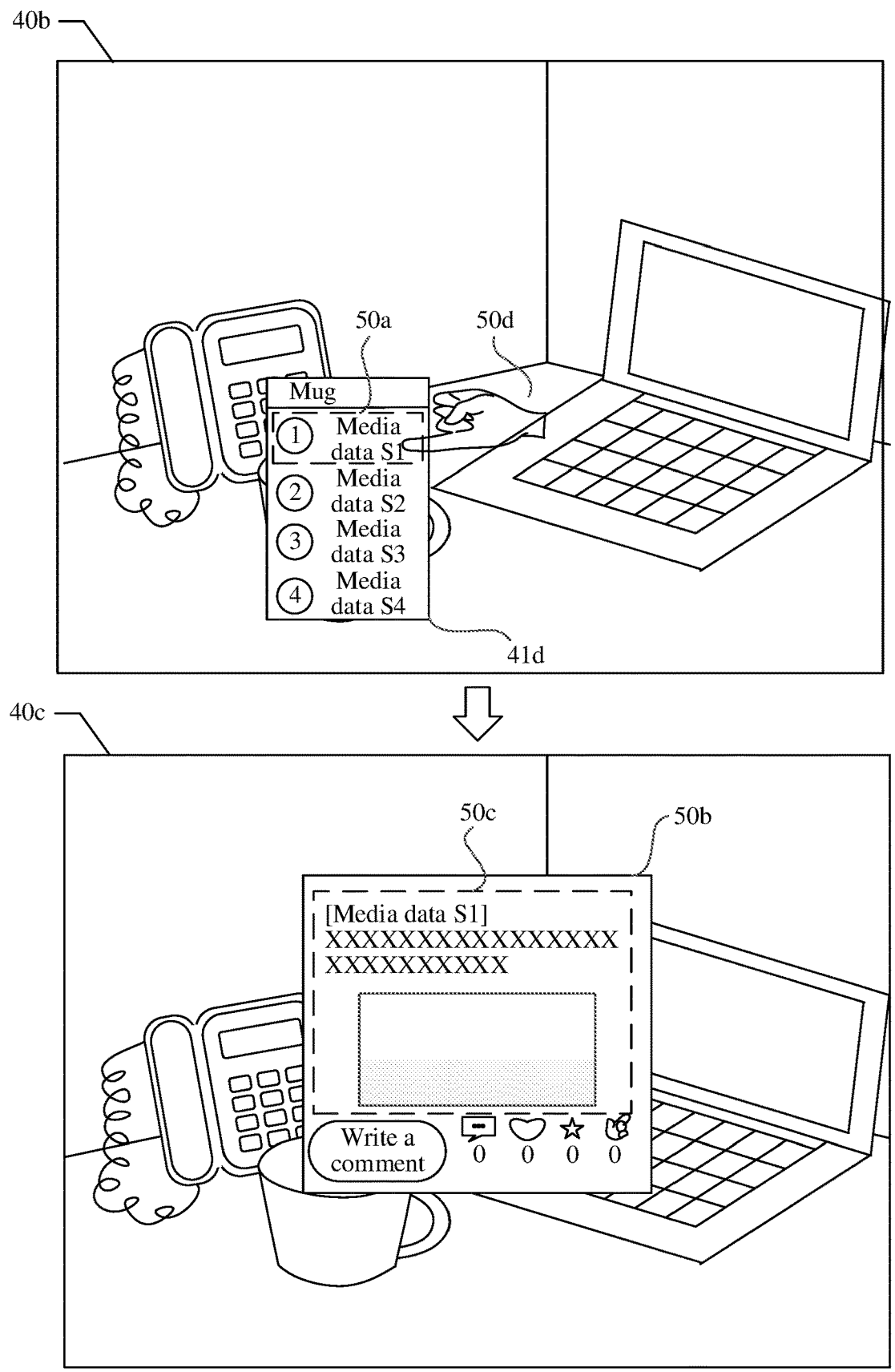
FIG. 5a is a schematic illustration of a scene for reading media data provided in an embodiment of this application.
Figure 5B:
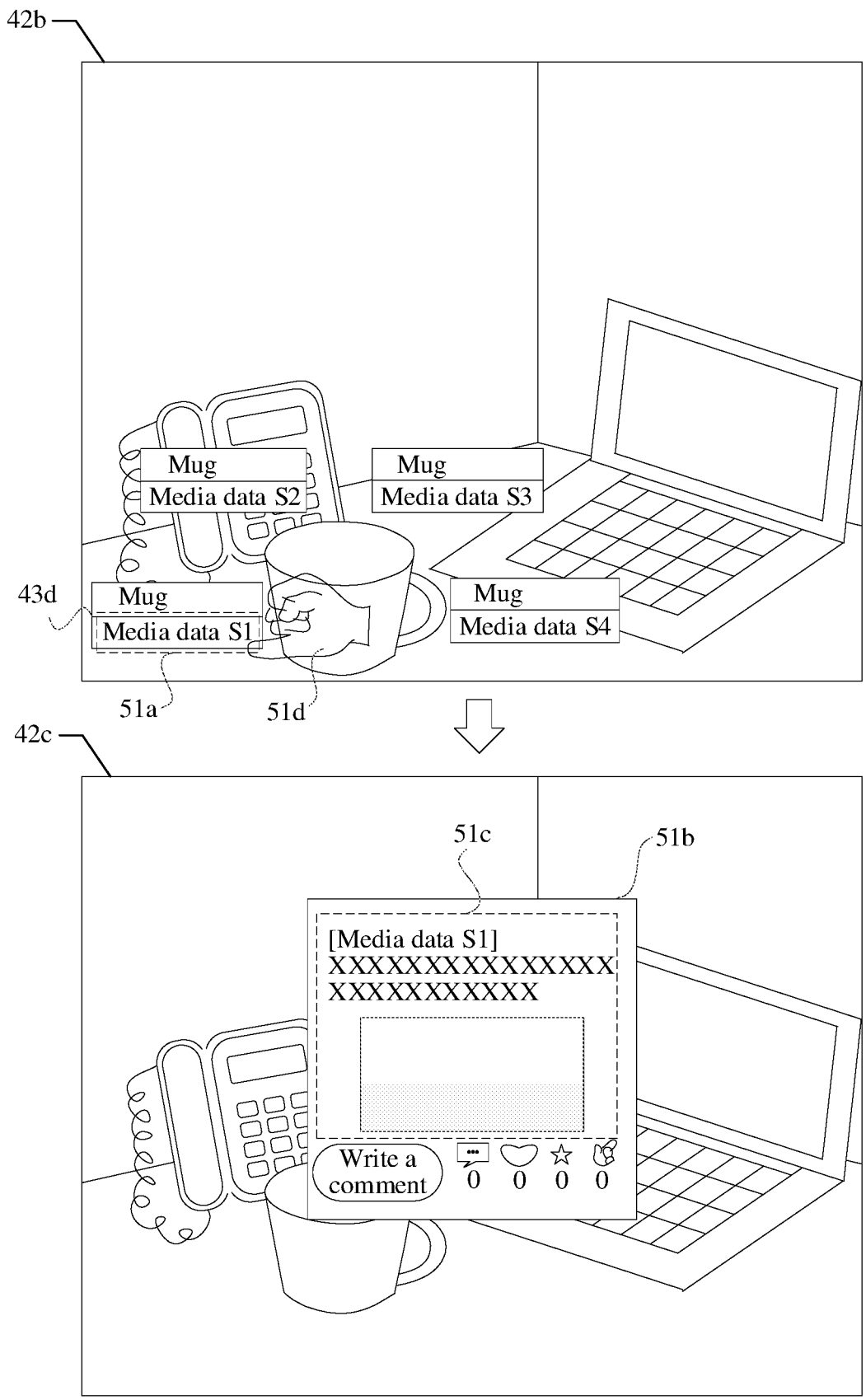
FIG. 5b is a schematic illustration of a scene for reading media data provided in an embodiment of this application.

To facilitate understanding, the specific process that the terminal device reads the media data in the scene corresponding to FIG. 4a may refer to FIG. 5a, and the specific process that the terminal device reads the media data in the scene corresponding to FIG. 4b may refer to FIG. 5b. FIG. 5a and FIG. 5b are schematic illustrations of scenes for reading media data provided in the embodiments of this application. The shooting interface 40b shown in FIG. 5a may be the shooting interface 40b shown in FIG. 4a, and the shooting interface 42b shown in FIG. 5b may be the shooting interface 42b shown in FIG. 4b. A second virtual rendering area 50b shown in FIG. 5a may be a second virtual rendering area 51b shown in FIG. 5b, and a media presentation content 50c shown in FIG. 5a may be a media presentation content 51c shown in FIG. 5b.

As shown in FIG. 5a, the presentation card 41d may be displayed in the shooting interface 40b, and the media data $S_1$, the media data $S_2$, the media data $S_3$ and the media data $S_4$ may be displayed in the presentation card 41d. It can be understood that when the interactive object needs to read the media presentation content corresponding to the media data $S_1$, the interactive object may perform the trigger operation on the media data $S_1$. The trigger operation herein may be a gesture operation 50d performed by the interactive object for an area 50a corresponding to the media data $S_1$.

In this way, the terminal device, in response to the gesture operation 50d performed by the interactive object for the area 50a corresponding to the media data $S_1$, may determine the media data $S_1$ as the target media data and display the second virtual rendering area 50b of the target object (namely, the target object 41a in the embodiment corresponding to FIG. 4a) in the shooting interface 40c. In addition, the terminal device may display the media presentation content 50c corresponding to the target media data in the second virtual rendering area 50b.

As shown in FIG. 5b, the presentation card 43d, the presentation card 43e, the presentation card 43f and the presentation card 43g may be displayed in the shooting interface 42b; the media data $S_1$ may be displayed in the presentation card 43d, the media data $S_2$ may be displayed in the presentation card 43e, the media data $S_3$ may be displayed in the presentation card 43f, and the media data $S_4$ may be displayed in the presentation card 43g. It can be understood that when the interactive object needs to read the media presentation content corresponding to the media data $S_1$, the interactive object may perform the trigger operation on the media data $S_1$. The trigger operation herein may be a gesture operation 51d performed by the interactive object for an area 51a corresponding to the media data $S_1$.

In this way, the terminal device, in response to the gesture operation 51d performed by the interactive object for the area 51a corresponding to the media data $S_1$, may determine the media data $S_1$ as the target media data and display the second virtual rendering area 51b of the target object (namely, the target object 43a in the embodiment corresponding to FIG. 4b) in the shooting interface 42b. The terminal device may display the second virtual rendering area 51b in the shooting interface 42c and display the media presentation content 51c corresponding to the target media data in the second virtual rendering area 51b.

The interactive object may also perform a closing operation for the second virtual rendering area 50b or the second virtual rendering area 51b, and the second virtual rendering area 51b herein is taken as an example for explanation. It can be understood that the computer device, in response to the closing operation for the second virtual rendering area 51b, may close the second virtual rendering area 51b and switch the shooting interface 42c to the shooting interface 42b.

In some embodiments, the terminal device may acquire a target update position of a target object in the updated shot picture in the shooting interface when the shot picture is updated. The terminal device may hide the first virtual rendering area and the media data and display a hidden identification for the target object in the shooting interface when the target update position is located in an edge area (namely, a non-secure area) in the shooting interface. The hidden state of the first virtual rendering area and the media data may be referred to as an omission mode. The terminal device may redisplay the first virtual rendering area including the media data in the shooting interface in response to a check operation of the hidden identification for the target object.

The edge area and the non-edge area are relative to the target object. The edge area is an area in which the target object is not completely displayed, and the non-edge area is an area in which the target object is completely displayed. For example, when the display position (namely, the target position) of the target object is a central area of the shooting interface (the area of the central area is 50% of the area of the shooting interface), and the target object can be completely displayed, then the display position of the target object is located in the non-edge area. When the shot picture is updated, the target update position of the target object in the updated shot picture in the shooting interface is a non-central area, and the target object cannot be completely displayed, then the target update position is located in the edge area.

Figure 6:
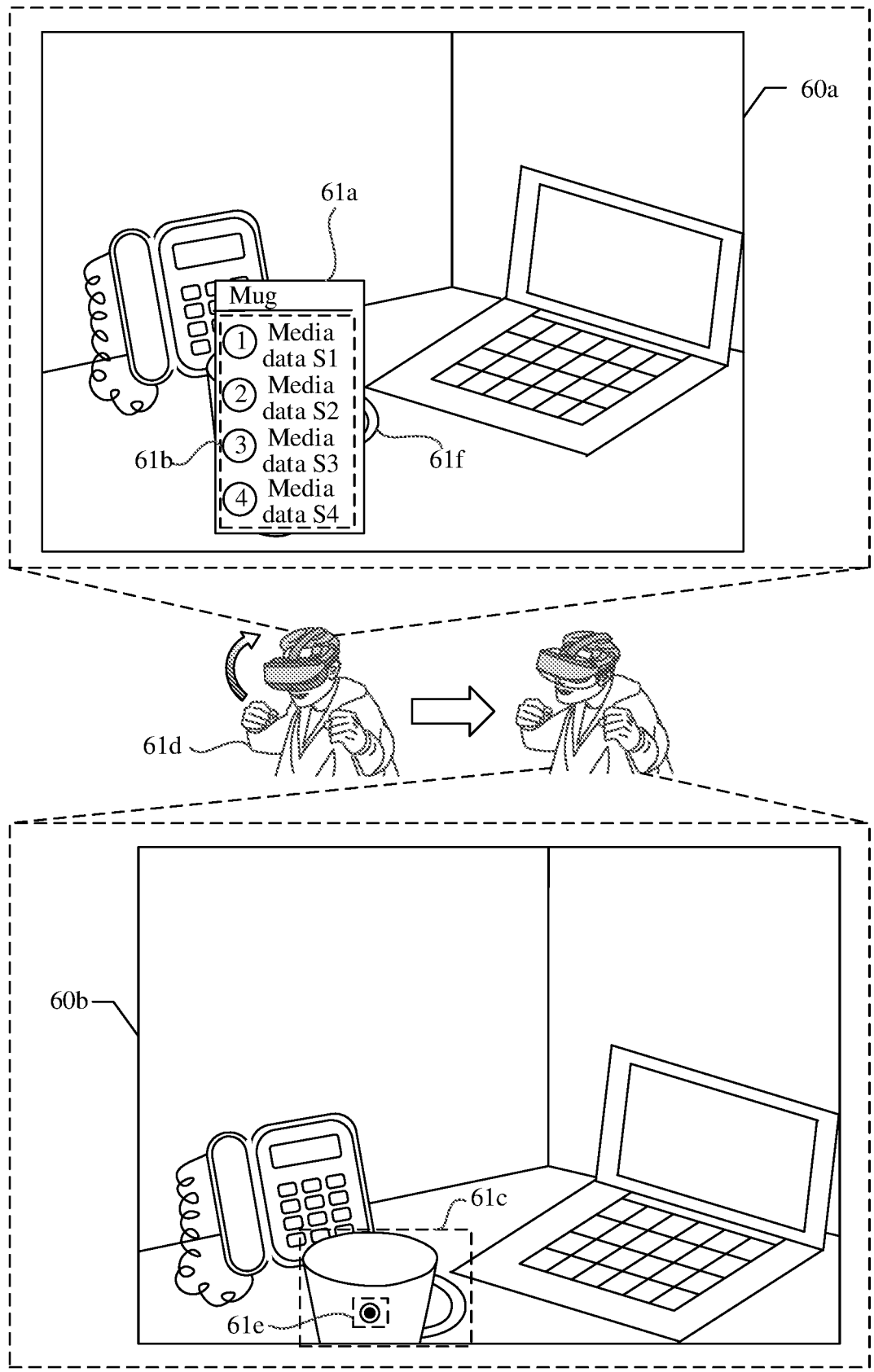
FIG. 6 is a schematic illustration of a scene for displaying a hidden identification provided in an embodiment of this application.

To facilitate understanding, reference may be made to FIG. 6. FIG. 6 is a schematic illustration of a scene for displaying a hidden identification provided in an embodiment of this application. As shown in FIG. 6, when the terminal device is a wearable device, an interactive object 61d may be a user wearing AR glasses. A shooting interface 60a may be observed in the AR glasses when the interactive object 61d wears the AR glasses and looks straight ahead; a shooting interface 60b may be observed in the AR glasses when an interactive object 61d slightly raises the head.

The shooting interface 60a shown in FIG. 6 may be the shooting interface 40b in the embodiment corresponding to the above FIG. 4a. The shooting interface 60a may include a first virtual rendering area 61a, and the first virtual rendering area 61a may include media data 61b. The shooting interface 60a shown in FIG. 6 may include the edge area and the non-edge area. A target object 61f is located in the non-edge area when the target object (e.g., the target object 61f) is completely displayed; the target object 61f is located in the edge area when the target object 61f is not completely displayed. Similarly, the edge area and the non-edge area corresponding to the shooting interface 60a may be included in the shooting interface 60b as shown in FIG. 6. It is understood that the edge area and the non-edge area are relative to the target object. For different target objects, the edge area and the non-edge area corresponding to different target objects are different.

As shown in FIG. 6, when the interactive object 61d slightly raises the head on the basis of looking straight ahead, the shot picture in the shooting interface may be updated due to moving the shooting component, and the shooting interface in the terminal device may be switched from the shooting interface 60a to the shooting interface 60b. The shooting interface 60b herein may be the updated shooting interface 60a. At the same time, the target position (not shown) of the target object 61f in the shooting interface 60a may be switched to a target update position 61c in the shooting interface 60b.

As shown in FIG. 6, the target position (not shown) of the target object 61f may be located in the non-edge area in the shooting interface 60a, and the target update position 61c of the target object 61f may be located in the edge area in the shooting interface 60b. At this time, the terminal device may hide the first virtual rendering area 61a and the media data 61b in the shooting interface 60a (the shooting interface 60b as shown in FIG. 6) and display a hidden identification 61e for the target object 61f in the shooting interface 60b. The first virtual rendering area 61a including the media data 61b in the shooting interface 60b may be redisplayed in response to a check operation of the hidden identification for the target object 61e.

It can be seen therefrom that in the embodiments of this application, when a shot picture in a shooting interface is captured by a shooting component, a first trigger operation for the shooting interface is combined with the shot picture, a target object in the shot picture indicated by a first trigger operation is determined, and then media data associated with an object classification of the target object is displayed in a first virtual rendering area of the target object. It is understood that the first virtual rendering area of the target object may be generated by the target object in the shot picture, thereby increasing the interaction way of the computer device. Furthermore, for the first trigger operation for different objects in the shot picture, the first virtual rendering area of the different objects is displayed in the shooting interface, thereby increasing the presentation way of the computer device.

Figure 7:
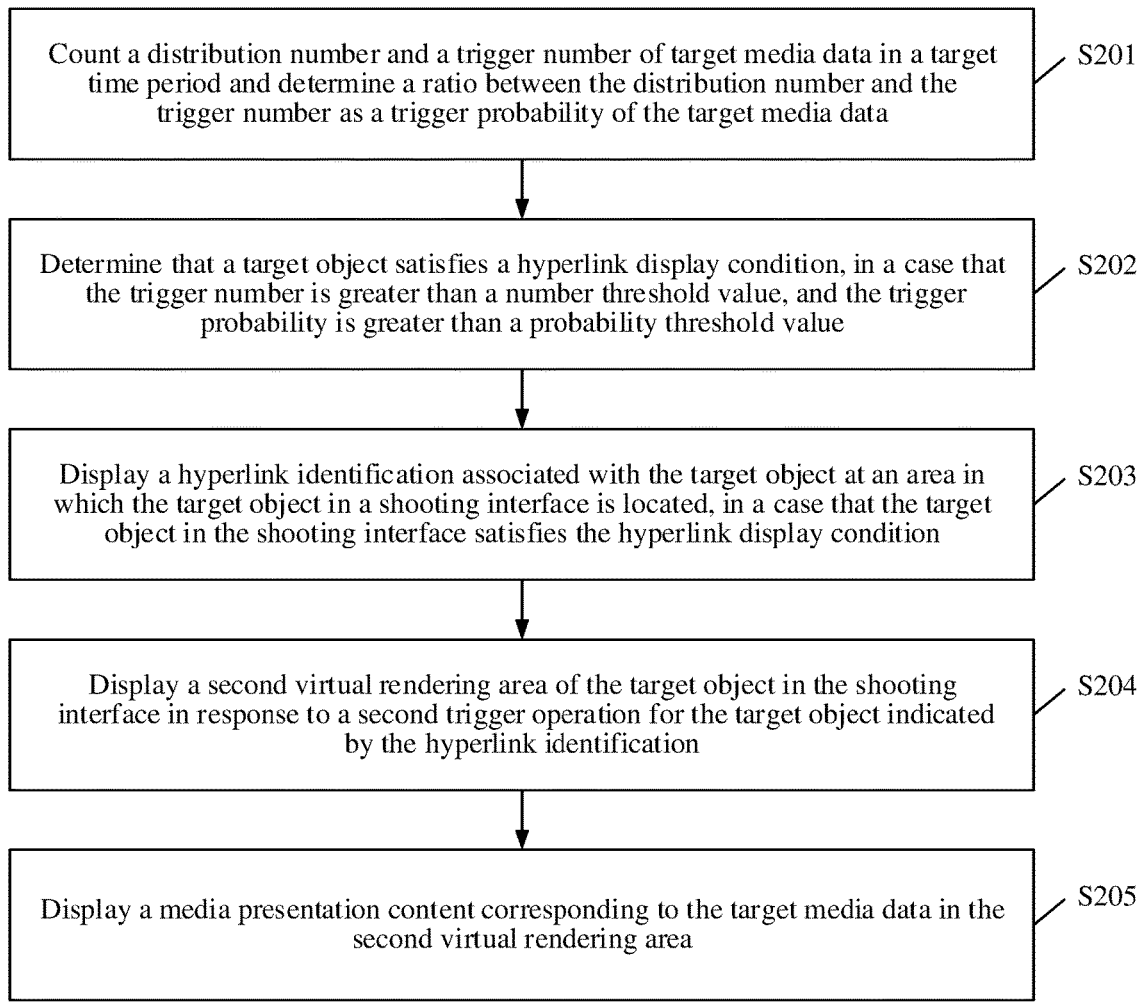
FIG. 7 is a flowchart of a data processing method provided in an embodiment of this application.

Reference may be made to FIG. 7. FIG. 7 is a flowchart of a data processing method provided in an embodiment of this application. The method may be performed by a server, a terminal device, or both the server and the terminal device. The server may be the server 20a in the embodiment corresponding to FIG. 2, and the terminal device may be the terminal device 20b in the embodiment corresponding to FIG. 2. To facilitate understanding, the embodiments of this application are described by taking the method performed by the terminal device as an example. The data processing method may include the following steps S201-S205.

Step S201: Count a distribution number and a trigger number of target media data in a target time period and determine a ratio between the distribution number and the trigger number as a trigger probability of the target media data.

The target media data may be any piece of media data recommended to the first virtual rendering area, and the embodiments of this application are described by taking an example that the target media data is media data that satisfies a hyperlink display condition.

It is understood that a time duration corresponding to the target time period is not defined in the embodiments of this application. For example, the time duration corresponding to the target time period may be 1 year, the time duration corresponding to the target time period may also be 1 month, and the time duration corresponding to the target time period may also be 1 hour. A time node in which the target time period is located is not defined in the embodiments of this application. For example, the target time period may be the time duration corresponding to the previous year, the target time period may also be the time duration before the current moment, and the target time period may also be the time duration within a specified time period before the current moment.

It is understood that the target media data may be any piece of media data in the first virtual rendering area, the distribution number may represent the number of the target media data distributed to the first virtual rendering area within the target time period, and the trigger number may represent the number of the target media data triggered in the first virtual rendering area within the target time period. For example, the target media data may be distributed to $Z_1$ terminal devices within the target time period. The $Z_1$ terminal devices all display the target media data in respective first virtual rendering areas. In addition, in the target media data displayed by the $Z_1$ terminal devices, $Z_2$ target media data is triggered by different interactive objects to read a media presentation content (namely, a detail pages) corresponding to the target media data. Therefore, $Z_1$ herein is the distribution number, and $Z_2$ herein is the trigger number, where $Z_1$ may be a positive integer, and $Z_2$ may be a positive integer less than or equal to $Z_1$.

Step S202: Determine that a target object satisfies a hyperlink display condition when the trigger number is greater than a number threshold value, and the trigger probability is greater than a probability threshold value.

For example, the terminal device may acquire the number threshold value, compare the trigger number with the number threshold value, and determine that the target object satisfies a hyperlink number condition when the trigger number is greater than the number threshold value (e.g., 1000). The terminal device may obtain the probability threshold value, compare the trigger probability with the probability threshold value, and determine that the target object satisfies a hyperlink probability condition when the trigger probability is greater than the probability threshold value (e.g., 60%). When the target object satisfies both the hyperlink number condition and the hyperlink probability condition, it is determined that the target object satisfies the hyperlink display condition.

It is understood that the embodiments of this application are described by taking an example that the target media data is media data associated with the target object, and objects (e.g., an object $P_1$) other than the target object may be included in the shot picture. When the trigger number of the target media data associated with the object $P_1$ is greater than the number threshold value, and the trigger probability of the target media data associated with the object $P_1$ is greater than the probability threshold value, it is determined that the object $P_1$ satisfies the hyperlink display condition.

Step S203: Display a hyperlink identification associated with the target object at an area in which the target object in a shooting interface is located when the target object in the shooting interface satisfies the hyperlink display condition.

The hyperlink identification is associated with the target media data in the media data. Namely, the category of the page pointed to by the hyperlink identification is consistent with the category of the target media data. In other words, when the trigger number and the trigger probability for the target media data satisfy the hyperlink display condition, the hyperlink identification associated with the target media data is displayed at the area in which the target object in the shooting interface is located.

Figure 8:
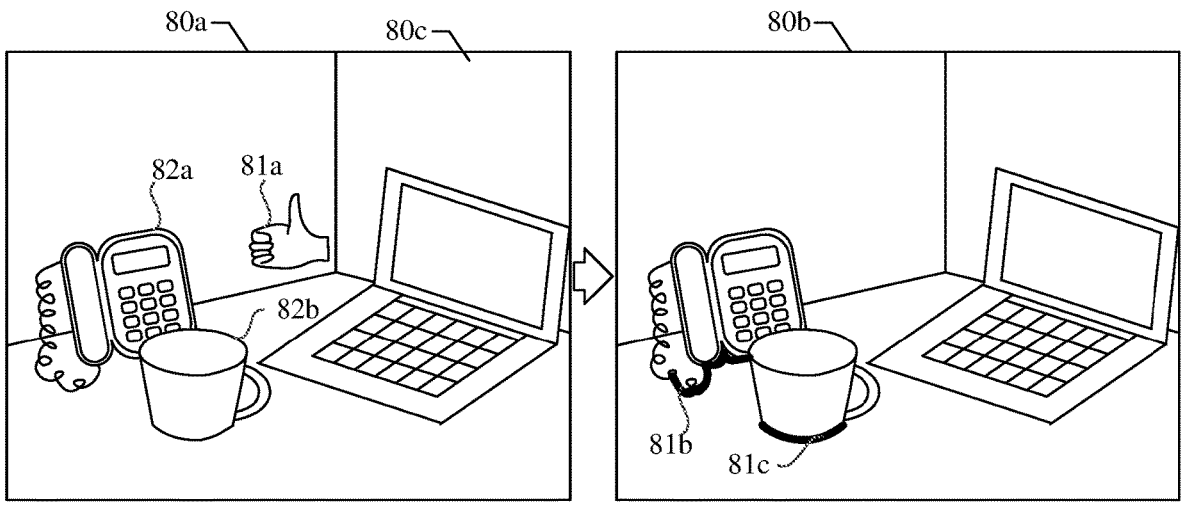
FIG. 8 is a schematic illustration of a scene for displaying a hyperlink identification provided in an embodiment of this application.

It is understood that the terminal device may directly display the hyperlink identification at the area in which the target object is located when the target object satisfies the hyperlink display condition. For example, the terminal device may also display the hyperlink identification at the area in which the target object is located after responding to a display operation for the shooting interface. The specific process that the terminal device responds to the display operation for the shooting interface may refer to FIG. 8. FIG. 8 is a schematic illustration of a scene for displaying a hyperlink identification provided in an embodiment of this application. A shooting interface 80a shown in FIG. 8 may be the shooting interface 40a in the embodiment corresponding to FIG. 4a.

As shown in FIG. 8, the shooting interface 80a of the terminal device may display a shot picture 80c captured by the shooting component, and the shot picture 80c may include a target object 82b that meets the interactive object's interest. The target object 82b herein may be a "mug" displayed in the shot picture 80c. Accordingly, the interactive object may perform the display operation for the shooting interface 80a, and the display operation herein may be a gesture operation 81a performed by the interactive object for the shooting interface 80a.

In this way, the terminal device, in response to the gesture operation 81a performed by the interactive object for the shooting interface 80a, may display a hyperlink identification 81c in an area in which the target object 82b is located to obtain the shooting interface 80b including the hyperlink identification 81c when the target object 82b satisfies the hyperlink display condition. The area in which the target object 82b is located may be any area for identifying the target object 82b. The embodiments of this application are described by taking an example that the area in which the target object 82b is located is the bottom of the target object 82b. Namely, the hyperlink identification 81c may be displayed at the bottom of the target object 82b.

Further, as shown in FIG. 8, an object 82a may be included in the shot picture 80c, and the object 82a herein may be a "telephone" displayed in the shot picture 80c. Therefore, the terminal device, in response to the gesture operation 81a performed by the interactive object for the shooting interface 80a, may display a hyperlink identification 81b in an area in which the object 82a is located in the shooting interface 80b when the object 82a satisfies the hyperlink display condition. The hyperlink identification 81b may be displayed at the bottom of the object 82a.

It is understood that in a case that the hyperlink identification is displayed in the shooting interface, when the interactive object needs to view the media presentation content indicated by the hyperlink identification, the computer device may perform the following steps S204-S205. For example, when the interactive object needs to directly acquire the media data associated with the object classification of the target object, the computer device may perform steps S102-S103 in the embodiment corresponding to FIG. 3 described above.

Step S204: Display a second virtual rendering area of the target object in the shooting interface in response to a second trigger operation for the target object indicated by the hyperlink identification.

For example, the terminal device, in response to the second trigger operation for the target object indicated by the hyperlink identification, may acquire the media presentation content corresponding to the target media data associated with the hyperlink identification to perform the following step S205 of displaying a media presentation content corresponding to the target media data in the second virtual rendering area.

Step S205: Display a media presentation content corresponding to the target media data in the second virtual rendering area.

To facilitate understanding, in the scene corresponding to FIG. 8, the specific process that the terminal device reads the media presentation content corresponding to the hyperlink identification may refer to FIG. 9. FIG. 9 is a schematic illustration of a scene for viewing a hyperobject link provided in an embodiment of this application. The shooting interface 80b shown in FIG. 9 may be the shooting interface 80b shown in FIG. 8.

As shown in FIG. 9, the target object 82b and the hyperlink identification 81c associated with the target object 82b may be included in the shooting interface 80b. It can be understood that when the interactive object needs to read the media presentation content corresponding to the hyperlink identification 81c, the interactive object may perform the second trigger operation for the target object 82b. The second trigger operation herein may be a gesture operation 90b performed by the interactive object for the target object 82b.

In this way, a second virtual rendering area 90a of the target object 82b is displayed in the shooting interface 80b, and the terminal device may respond to the gesture operation 90b performed by the interactive object for the target object 82b, and then display the second virtual rendering area 90a in the shooting interface 80c. The media presentation content 90c corresponding to the hyperlink identification 81c is displayed in the second virtual rendering area 90a. The media data corresponding to the media presentation content 90c may be the media data $S_1$. The second virtual rendering area 90a shown in FIG. 9 may be the second virtual rendering area 50b shown in FIG. 5a, and the media presentation content 90c shown in FIG. 5 may be the media presentation content 50c shown in FIG. 5a.

In addition, as shown in FIG. 9, the object 82a and the hyperlink identification 81b associated with the object 82a may be included in the shooting interface 80b. It can be understood that when the interactive object needs to read the media presentation content corresponding to the hyperlink identification 81b, the interactive object may perform the gesture operation 90b for the object 82a. As such, the terminal device may display a second virtual rendering area 90d (not shown) of the object 82a in the shooting interface 80b and further display a media presentation content 90e (not shown) corresponding to the hyperlink identification 81b in the second virtual rendering area 90d (not shown).

The media data corresponding to the media presentation content 90e (not shown) may be media data $S_9$.

It can be understood that the hyperlink identification 81c and the hyperlink identification 81b may also be referred to as hyperobject links (hyperlinks for short). The hyperobject links represent links from an object to other pages. By adding the hyperobject link to the object, it is able to jump to other pages associated with the object when using the hyperobject link corresponding to the object.

It is understood that the embodiments of this application may also automatically update the target media data associated with the hyperlink identification to change the hyperlink associated with the target object. The media data used for updating and replacing the target media data herein may be referred to as update media data. The target media data may be the media data associated with the hyperlink identification at time $T_1$, and the update media data may be the media data associated with the hyperlink identification at time $T_2$, where the time $T_2$ may be the next time to the time $T_1$.

The terminal device may count the distribution number of the update media data in the target time period and the trigger number of the update media data in the target time period, and determine whether the update media data satisfies the hyperlink display condition based on the distribution number corresponding to the update media data and the trigger number corresponding to the update media data. It can be understood that the computer device may display the hyperlink identification associated with the target object at an area in which the target object in the shooting interface is located when the update media data satisfies the hyperlink display condition. The hyperlink identification is associated with the update media data in the media data.

It can be seen therefrom that the embodiments of this application provide a method of intelligently generating a hyperlink identification (namely, a hyperobject link) for a target object based on a distribution number and a trigger number so as to realize the function of endowing a target object with a hyperlink. If the computer device finds that the interactive objects all browse for a long time (namely, the browsing time is greater than a time threshold value) in a certain result page (namely, media presentation content corresponding to the target media data), and the exposure accumulation of the media presentation content reaches a set number, it may be determined that the target object satisfies the hyperlink display condition, and the hyperobject link is automatically added to the target object. It can be understood that media data that meets the interactive object's interest can be quickly and accurately acquired using the hyperobject link, thereby improving the search efficiency for the target object and the search experience of the interactive object.

Reference may be made to FIG. 10. FIG. 10 is a flowchart of a data processing method provided in an embodiment of this application. The method may be performed by a server, a terminal device, or both the server and the terminal device. The server may be the server 20a in the embodiment corresponding to FIG. 2, and the terminal device may be the terminal device 20b in the embodiment corresponding to FIG. 2. To facilitate understanding, the embodiments of this application are described by taking the method performed by the terminal device as an example. The data processing method may include the following steps S301-S302.

Step S301: Display a virtual model object having a same shape as a target object in a shooting interface in response to a modeling operation for the target object in the shooting interface.

For example, the terminal device may determine depth information indicated by the shot picture in response to the modeling operation for the target object in the shooting interface, map the target object in the shot picture onto a three-dimensional space based on the depth information, and generate the virtual model object having the same shape as the target object in the three-dimensional space. The terminal device may display the virtual model object at a position in which the target object in the shooting interface is located. The virtual model object is displayed over the target object.

It can be understood that the shooting component with the depth information may record a depth value (namely, the depth information) of each pixel in shot image data of the shot picture by a depth buffer area. By the depth buffer area, an occlusion relationship of the pixels may be determined to ensure the accuracy of three-dimensional modeling (namely, the modeling operation). In addition, virtual objects may be placed in the current real environment by the three-dimensional modeling to realize the combination of the virtual environment and the real environment.

It is understood that the embodiments of this application are described by taking an example that the object for modeling processing is the target object, and objects (e.g., an object $P_2$) other than the target object may also be included in the shot picture. When the interactive object performs the modeling operation on the object $P_2$, the terminal device may display the virtual model object having the same shape as the object $P_2$ in the shooting interface.

To facilitate understanding, the specific process that the terminal device performs modeling processing on the target object may refer to FIG. 11. FIG. 11 is a schematic illustration of a scene for performing modeling processing provided in an embodiment of this application. A shooting interface 110*a* shown in FIG. 11 may be the shooting interface 40*a* in the embodiment corresponding to FIG. 4*a*.

As shown in FIG. 11, an object 111*b* may be included in the shooting interface 110*a*. It can be understood that when the interactive object needs to perform the modeling processing on the object 111*b*, the interactive object may perform the modeling operation on the object 111*b*. The modeling operation herein may be a gesture operation 111*a* performed by the interactive object for the object 111*b*.

In this way, the terminal device, in response to the gesture operation 111*a* performed by the interactive object for the object 111*b*, may display a virtual model object 111*c* having the same shape as the object 111*b* at a position in which the object 111*b* in the shooting interface 110*b* is located. The virtual model object 111*c* is displayed over the object 111*b*.

Step S302: Display the virtual model object at a virtual position in the shooting interface in response to a transformation operation for the virtual model object in the shooting interface.

The virtual position is a transformation position indicated by the transformation operation.

Figure 12A:
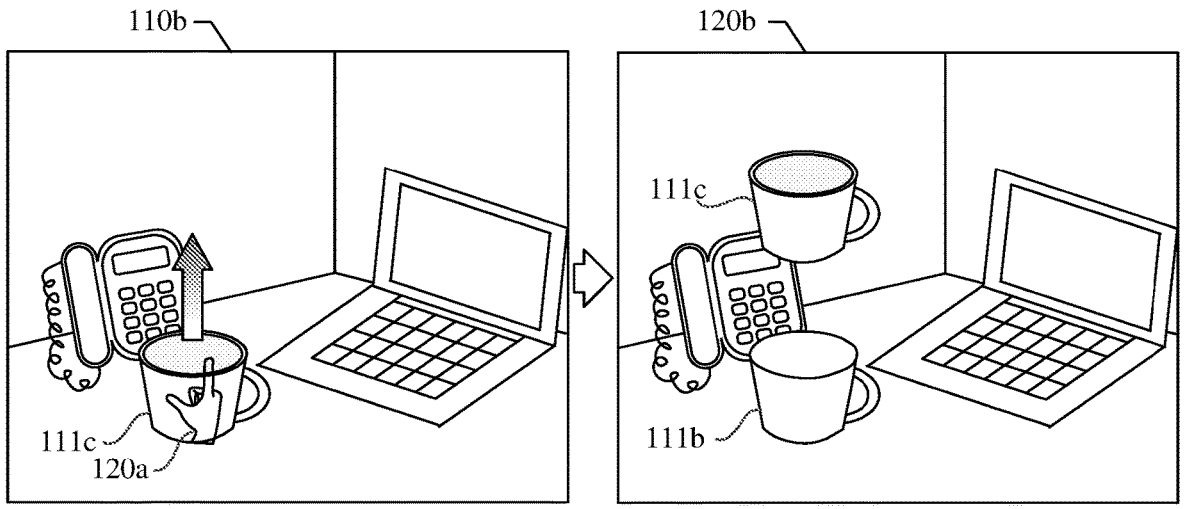
FIG. 12a is a schematic illustration of a scene for moving a virtual model object provided in an embodiment of this application.
Figure 12B:
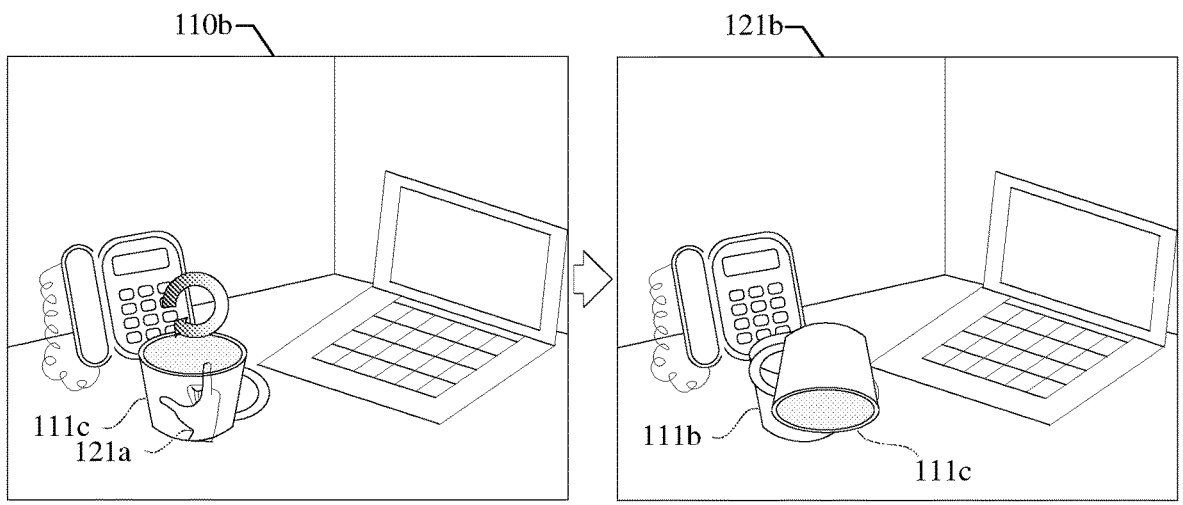
FIG. 12b is a schematic illustration of a scene for rotating a virtual model object provided in an embodiment of this application.
Figure 12C:
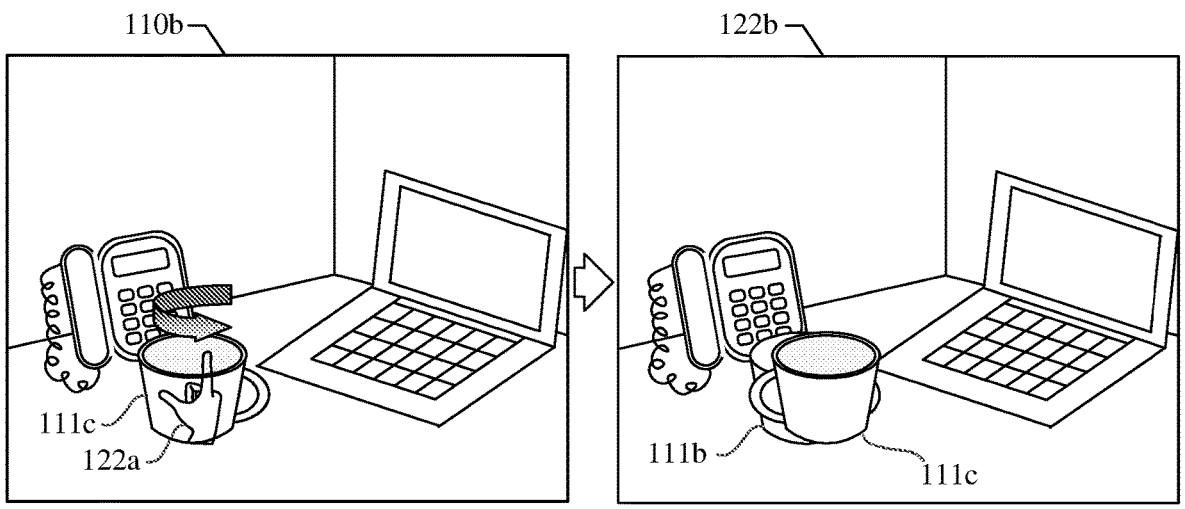
FIG. 12c is a schematic illustration of a scene for flipping a virtual model object provided in an embodiment of this application.

The transformation operation may include, but is not limited to, a moving operation, a rotating operation, and a flipping operation. To facilitate understanding, the specific process of performing the moving operation on the virtual model object may refer to FIG. 12*a*, and FIG. 12*a* is a schematic illustration of a scene for moving a virtual model object provided in an embodiment of this application. The specific process of performing the rotating operation on the virtual model object may refer to FIG. 12*b*, and FIG. 12*b* is a schematic illustration of a scene for rotating a virtual model object provided in an embodiment of this application. In addition, the specific process of performing the flipping operation on the virtual model object may refer to FIG. 12*c*, and FIG. 12*c* is a schematic illustration of a scene for flipping a virtual model object provided in an embodiment of this application. The shooting interface 110*b* shown in FIG. 12*a*, FIG. 12*b* and FIG. 12*c* may be the shooting interface 110*b* shown in FIG. 11.

As shown in FIG. 12*a*, the virtual model object 111*c* may be included in the shooting interface 110*b*, and the virtual model object 111*c* is displayed over the object 111*b*. It can be understood that when the interactive object needs to move the virtual model object 111*c*, the interactive object may perform the moving operation for the virtual model object 111*c*. The moving operation herein may be a gesture operation 120*a* performed by the interactive object for the virtual model object 111*c*.

In this way, the terminal device, in response to the gesture operation 120*a* performed by the interactive object for the virtual model object 111*c*, may perform moving processing on the virtual model object 111*c* in the shooting interface 110*b* and display the virtual model object 111*c* (namely, the virtual model object 111*c* in a shooting interface 120*b*) at a virtual position indicated by the gesture operation 120*a* (namely, an end position of a moving trajectory corresponding to the gesture operation 120*a*) in the shooting interface 110*b*. At this time, the object 111*b* under the virtual model object 111*c* is displayed in the shooting interface 120*b*.

As shown in FIG. 12*b*, the virtual model object 111*c* may be included in the shooting interface 110*b*, and the virtual model object 111*c* is displayed over the object 111*b*. It can be understood that when the interactive object needs to rotate the virtual model object 111*c*, the interactive object may perform the rotating operation for the virtual model object 111*c*. The rotating operation herein may be a gesture operation 121*a* performed by the interactive object for the virtual model object 111*c*.

In this way, the terminal device, in response to the gesture operation 121*a* performed by the interactive object for the virtual model object 111*c*, may perform rotating processing on the virtual model object 111*c* in the shooting interface 110*b* and display the rotated virtual model object 111*c* (namely, the virtual model object 111*c* in a shooting interface 121*b*) at a virtual position indicated by the gesture operation 121*a* (namely, an original position indicated by the gesture operation 121*a*) in the shooting interface 110*b*.

As shown in FIG. 12*c*, the virtual model object 111*c* may be included in the shooting interface 110*b*, and the virtual model object 111*c* is displayed over the object 111*b*. It can be understood that when the interactive object needs to flip the virtual model object 111*c*, the interactive object may perform the flipping operation for the virtual model object 111*c*. The flipping operation herein may be a gesture operation 122*a* performed by the interactive object for the virtual model object 111*c*.

In this way, the terminal device, in response to the gesture operation 122*a* performed by the interactive object for the virtual model object 111*c*, may perform flipping processing on the virtual model object 111*c* in the shooting interface 110*b* and display the flipped virtual model object 111*c* (namely, the virtual model object 111*c* in a shooting interface 122*b*) at a virtual position indicated by the gesture operation 122*a* (namely, an original position indicated by the gesture operation 122*a*) in the shooting interface 110*b*.

It can be understood that when the interactive object needs to perform the search processing on the object 111*b*, the interactive object may perform the first trigger operation for the object 111*b* to display the first virtual rendering area of the object 111*b* in the shooting interface 110*a*. For example, when the interactive object needs to perform the search processing on the object 111b, the interactive object may also perform the first trigger operation for the virtual model object 111c in the shooting interface 120b shown in FIG. 12a, the virtual model object 111c in the shooting interface 121b shown in FIG. 12b, or the virtual model object 111c in the shooting interface 122b shown in FIG. 12c to display the first virtual rendering area of the object 111b (i.e., the virtual model object 111c) in the shooting interface 120b, the shooting interface 121b, or the shooting interface 122b.

It can be understood that when the virtual model object 111c in the shooting interface 120b, the shooting interface 121b, or the shooting interface 122b satisfies the hyperlink display condition (namely, the object 111b satisfies the hyperlink display condition), the hyperlink identification associated with the virtual model object 111c (namely, the hyperlink identification associated with the object 111b) is displayed at an area in which the virtual model object 111c in the shooting interface 120b, the shooting interface 121b, or the shooting interface 122b is located.

It can be seen therefrom that in the embodiments of this application, the virtual model object having the same shape as the target object may be displayed in the shooting interface after responding to the modeling operation for the target object in the shooting interface, and the virtual model object may further be displayed at the virtual position in the shooting interface after responding to the transformation operation for the virtual model object. It can be understood that in the embodiments of this application, three-dimensional modeling may be performed on the target object indicated by the modeling operation to obtain the virtual model object, thereby realizing the interaction with the virtual model object. In this way, materials may be accumulated for a three-dimensional library in the backstage. When the interactive object searches for a relevant three-dimensional model, the backstage may recommend the above virtual model object (namely, a search result) obtained by the three-dimensional modeling to improve the operation and understanding of the interactive object on the target object in an AR mode.

Figure 13:
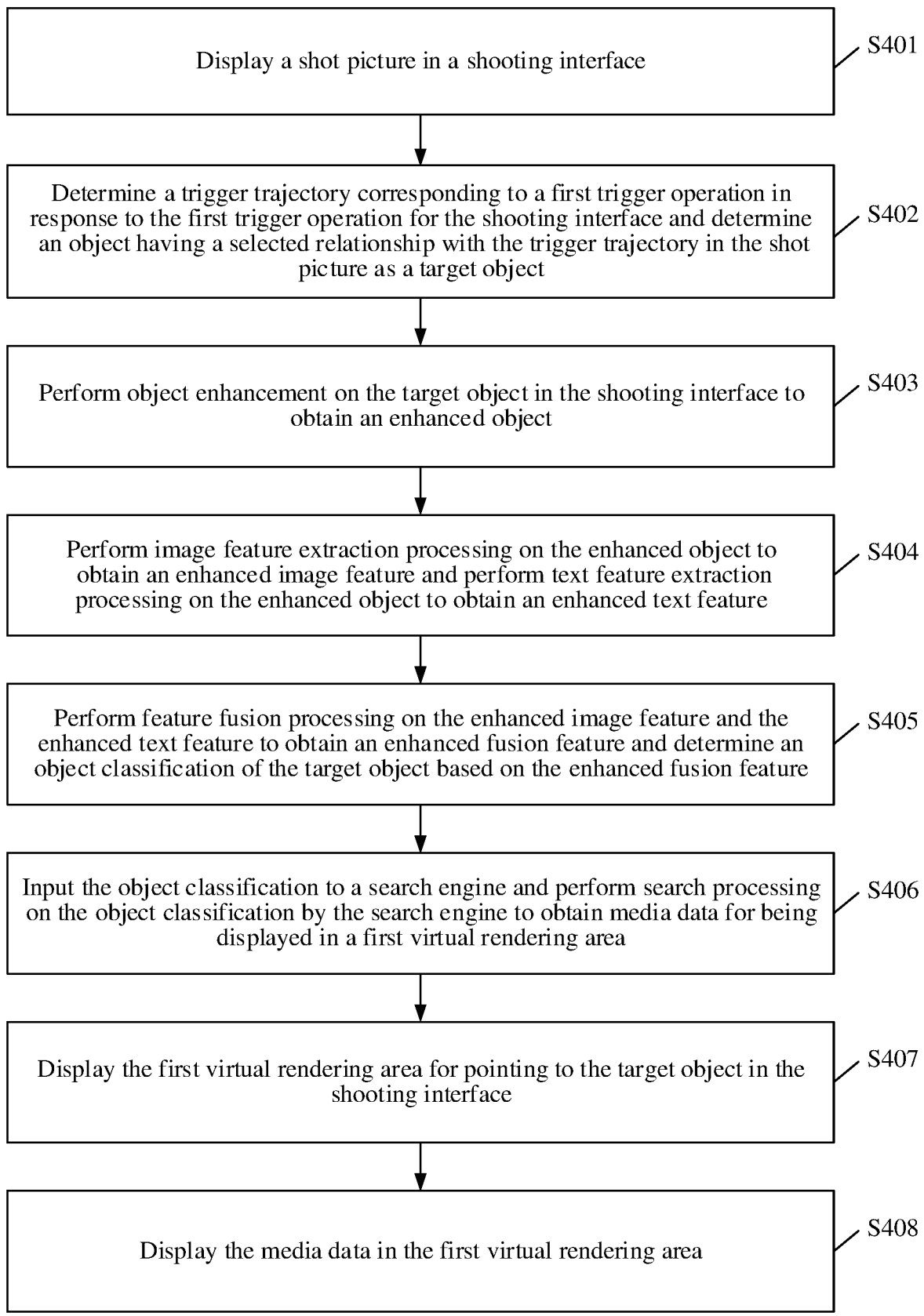
FIG. 13 is a flowchart of a data processing method provided in an embodiment of this application.

Reference may be made to FIG. 13. FIG. 13 is a flowchart of a data processing method provided in an embodiment of this application. The method may be performed by a computer device. The computer device may be a server or a terminal device. The server may be the server 20a in the embodiment corresponding to FIG. 2, and the terminal device may be the terminal device 20b in the embodiment corresponding to FIG. 2. The data processing method may include the following steps S401-S408, and step S402 is an implementation of step S102.

Step S401: Display a shot picture in a shooting interface.

The shot picture is captured by a shooting component and includes a target object.

The specific process that the computer device displays the shot picture in the shooting interface may refer to the above description of step S101 in the embodiment corresponding to FIG. 3, which will not be described in detail herein.

Step S402: Determine a trigger trajectory corresponding to a first trigger operation in response to the first trigger operation for the shooting interface and determine an object having a selected relationship with the trigger trajectory in the shot picture as a target object.

For example, the computer device may determine the trigger trajectory corresponding to the first trigger operation in response to the first trigger operation of a trigger object when the trigger object displayed in the shooting interface is captured by a shooting component. Alternatively, the computer device may acquire the trigger trajectory of the first trigger operation on a screen in response to the first trigger operation for the screen corresponding to the shooting interface. The computer device may superimpose the trigger trajectory and the shot picture and determine objects having an intersecting relationship with the trigger trajectory at an object position in the shot picture as superimposed objects. The computer device may determine the target object having a selected relationship with the trigger trajectory from the superimposed objects.

The trigger object in the shooting interface may be any object in real life, for example, a hand, a foot, a pen, and a pencil. It is understood that the embodiments of this application are described by taking an example that the trigger object is the hand of the interactive object, and the hand herein may be the left hand or the right hand of the interactive object. It can be understood that when the trigger object is the hand of the interactive object, the trigger object may be a finger of the interactive object. At this time, the embodiments of this application need to use a fingertip recognition technology (namely, a fingertip technology) in the gesture recognition. In addition, a movement trajectory (namely, trigger trajectory) along the fingertip and "?" (namely, auxiliary instruction trajectory) is fitted so as to perform similarity determination on the auxiliary instruction trajectory and the trigger trajectory.

When the number of the superimposed objects is one, the computer device may directly determine the superimposed object as the target object having a selected relationship with the trigger trajectory. For example, when the number of the superimposed objects is at least two, the specific process that the computer device determines the target object having a selected relationship with the trigger trajectory from at least two superimposed objects may refer to the following description of step S4023 in the embodiment corresponding to FIG. 16.

It is understood that the computer device may perform image pre-processing on shot image data in the shot picture to obtain pre-processed image data. The computer device may perform object edge detection on the pre-processed image data to obtain a set of object edge nodes of the pre-processed image data. The set of the object edge nodes includes edge nodes in the pre-processed image data. The computer device may recognize the object position of the target object in the shot picture in the shooting interface based on the edge nodes in the set of the edge nodes.

It can be understood that the specific process that the computer device performs image pre-processing on the shot image data acquired by the shooting component can be described as: the shot image data is denoised by median filtering (for example, median filtering is realized by a medianblur function), thereby increasing the contrast of the shot image data to clearly display the edge details in the shot image data.

It can be understood that the computer device may determine a gradient and a direction of each pixel point in the pre-processed image data by an edge detection algorithm (for example, the Canny algorithm), and then determine whether the pixel point belongs to the edge nodes on the edge of the object based on the gradient and the direction of each pixel point. When the deviation between the gradient of the pixel point and the gradient of the edge node is less than a gradient threshold value, and the deviation between the direction of the pixel point and the direction of the edge node is less than a direction threshold value, the pixel point is recognized as the edge node. A set of the recognized edge nodes is set as the set of the edge nodes, and an object position and an object area of an initial object formed by the edge nodes in the set of the edge nodes in the shooting interface are calculated. The initial object herein may include the target object in the shot picture.

It is understood that when a plurality of the initial objects are recognized and obtained in the pre-processed image data by the above edge detection algorithm, the computer device may determine the ratios of object area of each initial object to the shooting interface, and the initial objects with the ratio greater than a ratio threshold value are filtered from the plurality of the initial objects. Therefore, in the embodiments of this application, the initial objects with the object area greater than an area threshold value may be filtered from the plurality of the initial objects obtained by the edge detection algorithm. Namely, the initial objects with the smaller area (i.e., the object area is less than or equal to the area threshold value) in the pre-processed image data are removed. The initial objects with the smaller area may be long-range objects in the pre-processed image data, and the initial object with the smaller area may also be tiny objects in the pre-processed image data. The initial objects after removing the initial objects with the smaller area are simply referred to as objects.

For example, the first trigger operation includes a voice trigger operation. In this way, the computer device may acquire audio data corresponding to the voice trigger operation in response to the voice trigger operation for the shooting interface and determine an object having a matching relationship with voice text data indicated by the audio data in the shot picture as the target object. Namely, the object indicated by the voice text data in the shot picture is determined as the target object, and the matching relationship represents a consistent relationship with the text description.

It can be understood that the computer device may perform voice recognition on the audio data to obtain the voice text data indicated by the audio data. For example, the voice text data may be a "notebook computer". Therefore, the computer device may determine an object having a matching relationship with (i.e., consistent with the text description of) the "notebook computer" in the shot picture as the target object. That is to say, the "notebook computer" in the shooting interface is determined as the target object.

Figure 14A:
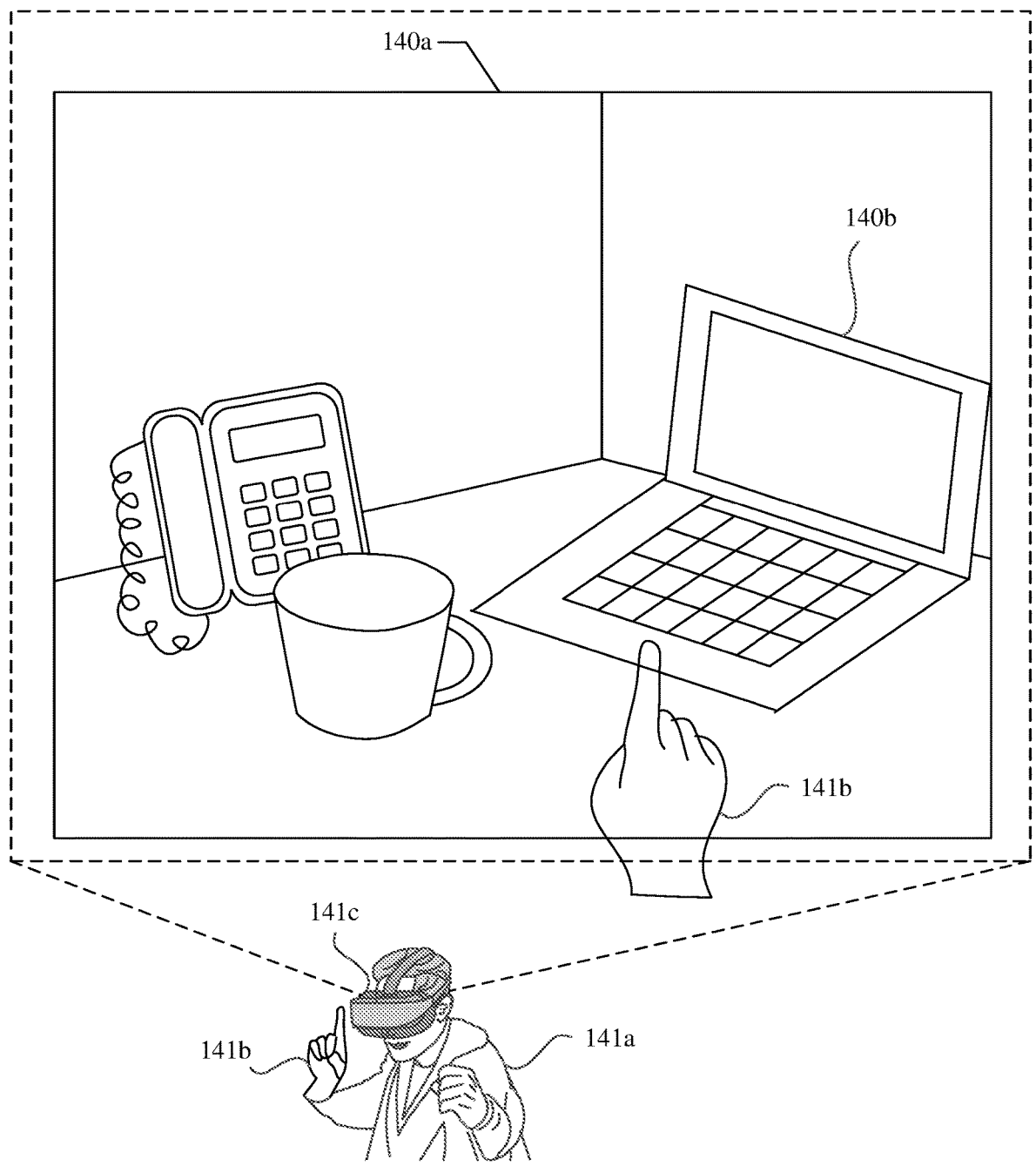
FIG. 14a is a schematic illustration of a scene for determining a target object provided in an embodiment of this application.
Figure 14B:
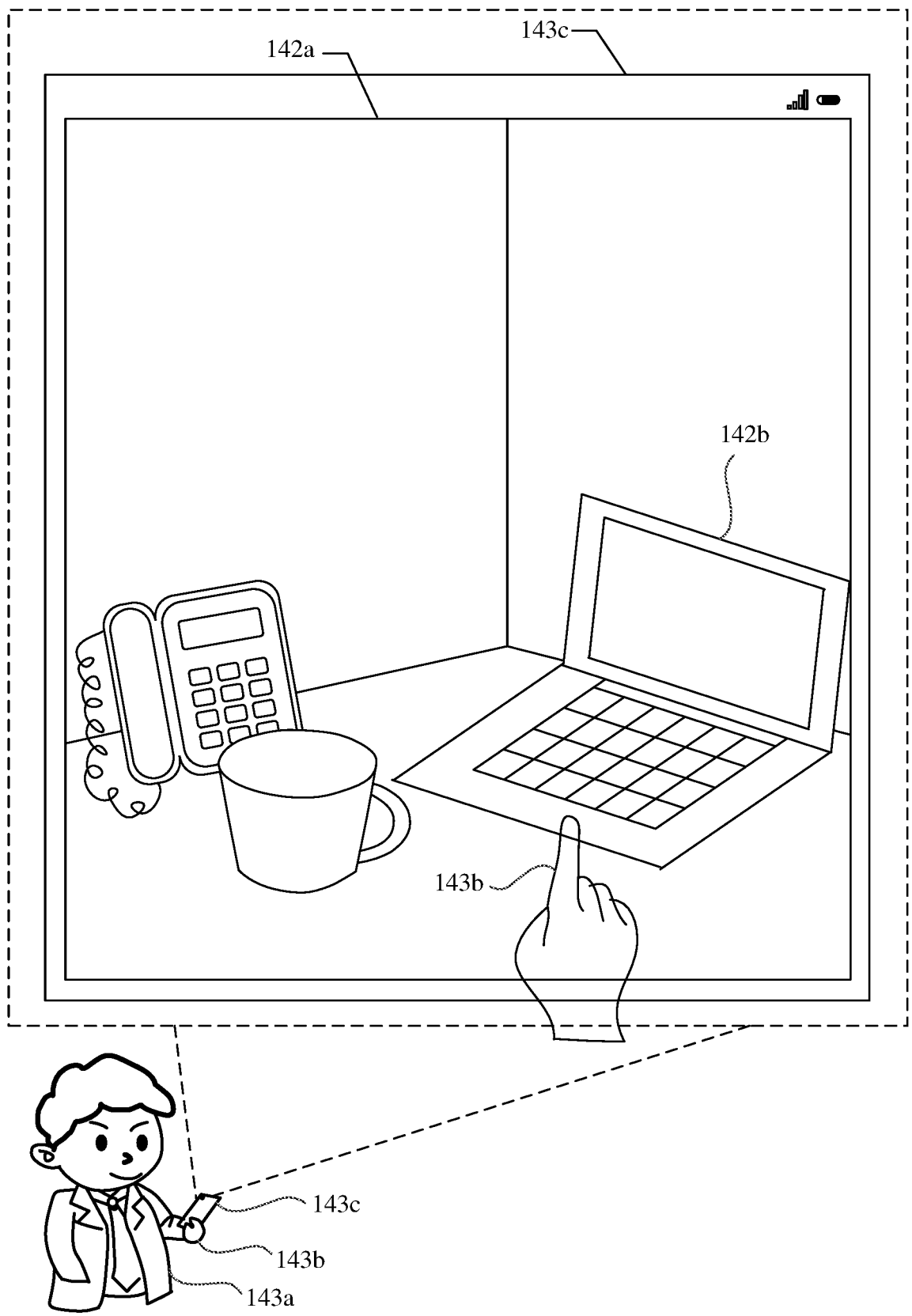
FIG. 14b is a schematic illustration of a scene for determining a target object provided in an embodiment of this application.
Figure 14C:
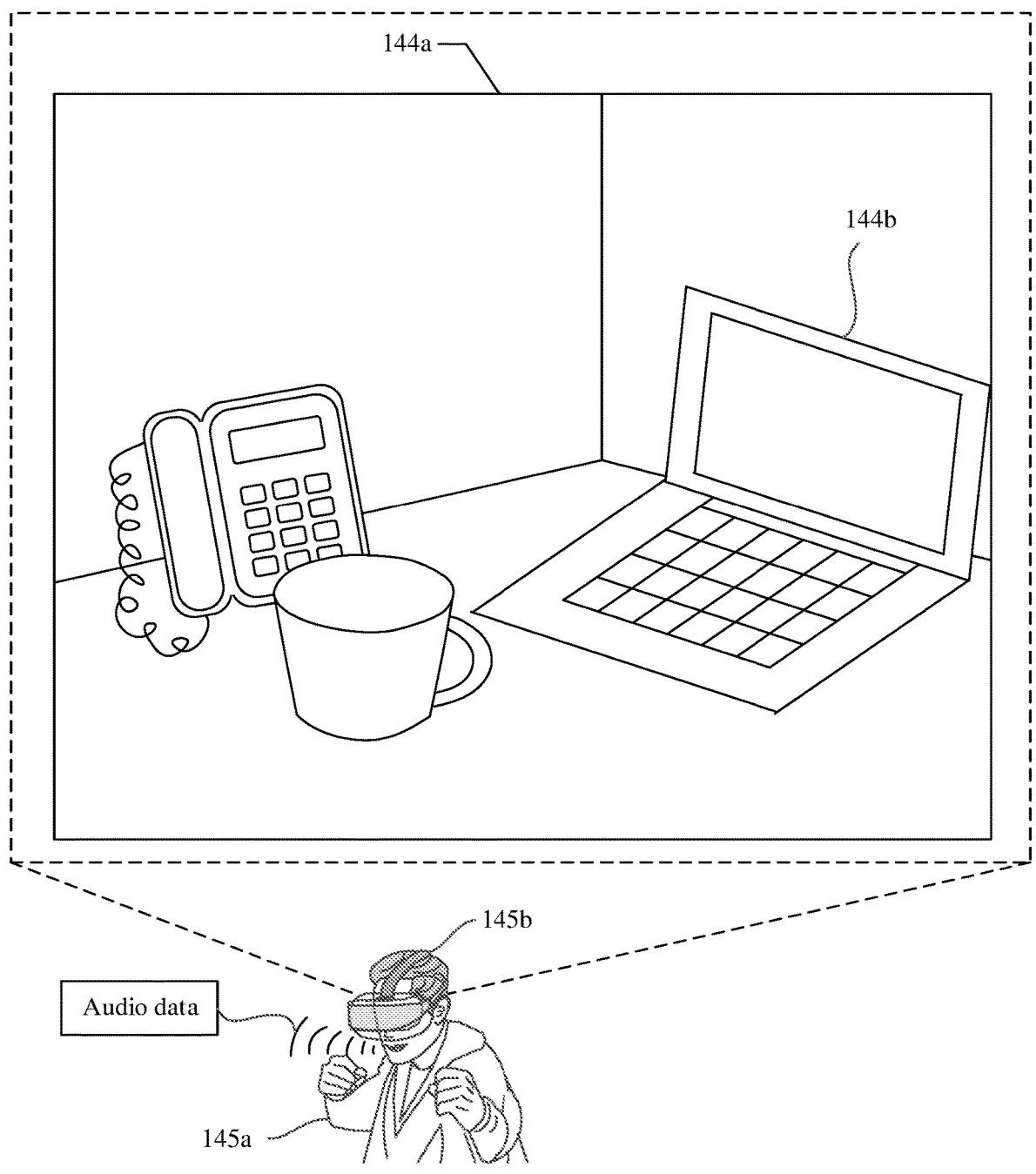
FIG. 14c is a schematic illustration of a scene for determining a target object provided in an embodiment of this application.

To facilitate understanding, the specific process that the computer device responds to the first trigger operation of the trigger object may refer to FIG. 14a. The specific process that the computer device responds to the first trigger operation for the screen including the shooting interface may refer to FIG. 14b. In addition, the specific process that the computer device responds to the voice trigger operation for the shooting interface may refer to FIG. 14c. FIG. 14a, FIG. 14b, and FIG. 14c are schematic illustration of scenes for determining a target object provided in an embodiment of this application.

As shown in FIG. 14a, when the terminal device is a wearable device, the terminal device may be AR glasses 141c, and an interactive object 141a may be a user using the AR glasses 141c. The interface observed by the interactive object 141a in the AR glasses 141c may be a shooting interface 140a, and the shooting interface 140a displays an object 140b.

Therefore, when the interactive object 141a needs to perform search processing on the object 140b, the interactive object 141a may lift an arm and display its own hand 141b in the shooting interface and then perform the first trigger operation for the object 140b displayed in the shooting interface 140a by the hand 141b of the interactive object 141a. In this way, the AR glasses 141c may capture the hand 141b displayed in the shooting interface 140a by the shooting component and determine the target object (i.e., the object 140b) indicated by the first trigger operation in the shooting interface 140a in response to the first trigger operation performed by the hand 141b of the interactive object 141a for the shooting interface 140a.

As shown in FIG. 14b, when the terminal device is a mobile device, the terminal device may be a smart phone 143c, and an interactive object 143a may be a user using the smart phone 143c. The interface observed by the interactive object 143a in the smart phone 143c may be a shooting interface 142a, and the shooting interface 142a displays an object 142b.

Therefore, when the interactive object 143a needs to perform search processing on the object 142b, the interactive object 143a may perform the first trigger operation for the object 142b in the screen (i.e., the screen on the smart phone 143c) including the shooting interface 142a by the hand 143b. Thus, the smart phone 143c may determine the target object (i.e., the object 142b) indicated by the first trigger operation in the shooting interface 142a in response to the first trigger operation performed by the hand 143b of the interactive object 143a for the shooting interface 142a.

As shown in FIG. 14c, a terminal device 145b may be a device having a voice data processing function, and the interactive object 145a may be a user using the terminal device 145b. The interface observed by the interactive object 145a in the terminal device 145b may be a shooting interface 144a, and the shooting interface 144a may include an object 144b.

Therefore, when the interactive object 145a needs to perform search processing on the object 144b, the interactive object 145a may perform the voice trigger operation for the object 144b in the shooting interface 144a. In this way, the terminal device 145b, in respond to the voice trigger operation performed by the interactive object 145a for the shooting interface 144a, may acquire audio data corresponding to the voice trigger operation, perform voice recognition on the audio data to obtain voice text data indicated by the audio data, and then determine the target object (namely, the object 144b) having a matching relationship with the voice text data in the shooting interface 144a. Namely, the object 144b having a matching relationship with the voice text data indicated by the audio data is determined in the shooting interface 144a.

Step S403: Perform object enhancement on the target object in the shooting interface to obtain an enhanced object.

It can be understood that the computer device may perform the object enhancement on the target object by an image enhancement algorithm (namely, an enhancement algorithm). The image enhancement algorithm may be used for adjusting the brightness, contrast, saturation, hue and the like of the shot image data in the shot picture, increasing the definition of the shot picture, reducing the noise, and the like to acquire useful information in the shot image data. The object enhancement may be realized by the image enhancement, and the enhanced object may be acquired from the shot image data after the image enhancement. The image enhancement usually completes the above functions by a combination of multiple algorithms. For example, image denoising is equivalent to a low-pass filter, and increasing the definition is a high-pass filter. It is understood that the specific algorithm included in the image enhancement algorithm and the execution flow thereof are not defined in the embodiments of this application.

Step S404: Perform image feature extraction processing on the enhanced object to obtain an enhanced image feature and perform text feature extraction processing on the enhanced object to obtain an enhanced text feature.

It can be understood that the image feature extraction may extract the features such as shape, texture, and color of the target object to obtain the enhanced image feature. When the target object includes text information, pre-processing (namely, segmentation, size normalization, and stroke width normalization) is performed on the text information by the text feature extraction, and then character recognition is performed on the text information to obtain the enhanced text feature (namely, a character included in the target object).

Step S405: Perform feature fusion processing on the enhanced image feature and the enhanced text feature to obtain an enhanced fusion feature and determine an object classification of the target object based on the enhanced fusion feature.

The way of performing the feature fusion on the enhanced image feature and the enhanced text feature by the computer device may be a way of feature splicing, may further be a way of feature addition, and may furthermore be a way of feature weighted average. The specific way of the feature fusion is not defined in the embodiments of this application.

For example, when the target object does not include the text information, the computer device may directly perform classification processing based on the extracted enhanced image feature without performing the text feature extraction on the enhanced object to obtain the object classification of the target object.

Step S406: Input the object classification to a search engine and perform search processing on the object classification by the search engine to obtain media data for being displayed in a first virtual rendering area.

For example, the computer device may input the object classification to the search engine and perform the search processing on the object classification by the search engine to obtain a set of the media data associated with the object classification. The search engine may be a search technology corresponding to an application client configured to perform the search processing. The computer device may acquire historical trigger information corresponding to an interactive object and perform a feature analysis on the historical trigger information to obtain a historical object feature of the interactive object. The interactive object refers to an object to start the shooting component to acquire the shot picture. The computer device may sort the media data in the set of the media data based on the historical object feature and acquire the media data for being displayed in the first virtual rendering area from the sorted media data.

It can be understood that the historical trigger information may represent an author who meets the interactive object's interest, the read media data, and the like. The computer device may advance the order of the media data published by the author who meets the interactive object's interest, the read media data, and the like. In this way, the computer device may obtain the media data after the order adjustment (namely, after the sorting processing), truncate the previous L pieces of media data from the media data after the order adjustment, and display the L pieces of media data with priorities in the first virtual rendering area based on the priorities of the L pieces of media data, where L may be a positive integer less than or equal to the media number of the media data in the set of the media data.

It can be understood that the specific implementations of this application relate to the relevant data, including the distribution number, the trigger number, and the historical trigger information. When the above embodiments of this application are applied to a specific product or technology, it is necessary to obtain the user's permission or consent, and the collection, use and processing of the relevant data need to comply with the relevant laws, regulations and standards of the relevant countries and regions.

Step S407: Display the first virtual rendering area of the target object in the shooting interface.

The specific process that the computer device displays the first virtual rendering area of the target object in the shooting interface may refer to the above description of step S102 in the embodiment corresponding to FIG. 3, which will not be described in detail herein.

It can be understood that when the computer device displays the first virtual rendering area in the shooting interface, it is necessary to determine whether the first virtual rendering area is clearly displayed. The computer device needs to determine a font size (for example, 12 pixels (px)) corresponding to the first virtual rendering area and a background color corresponding to the first virtual rendering area. The computer device needs to determine the depth of the background bottom color of the shooting interface and ensure that the contrast between the background color and the background color is greater than or equal to a background threshold value (for example, 1.7). When the contrast between the background bottom color and the background color is less than the background threshold value, the background color is adjusted to enable the contrast between the background bottom color and the background color to be greater than or equal to the background threshold value.

Step S408: Display the media data in the first virtual rendering area.

The media data is associated with an object classification of the target object. The media data displayed in the first virtual rendering area is L pieces of media data acquired in the above step S406.

The specific process that the computer device displays the media data in the first virtual rendering area may refer to the above description of step S103 in the embodiment corresponding to FIG. 3, which will not be described in detail herein.

Figure 15:
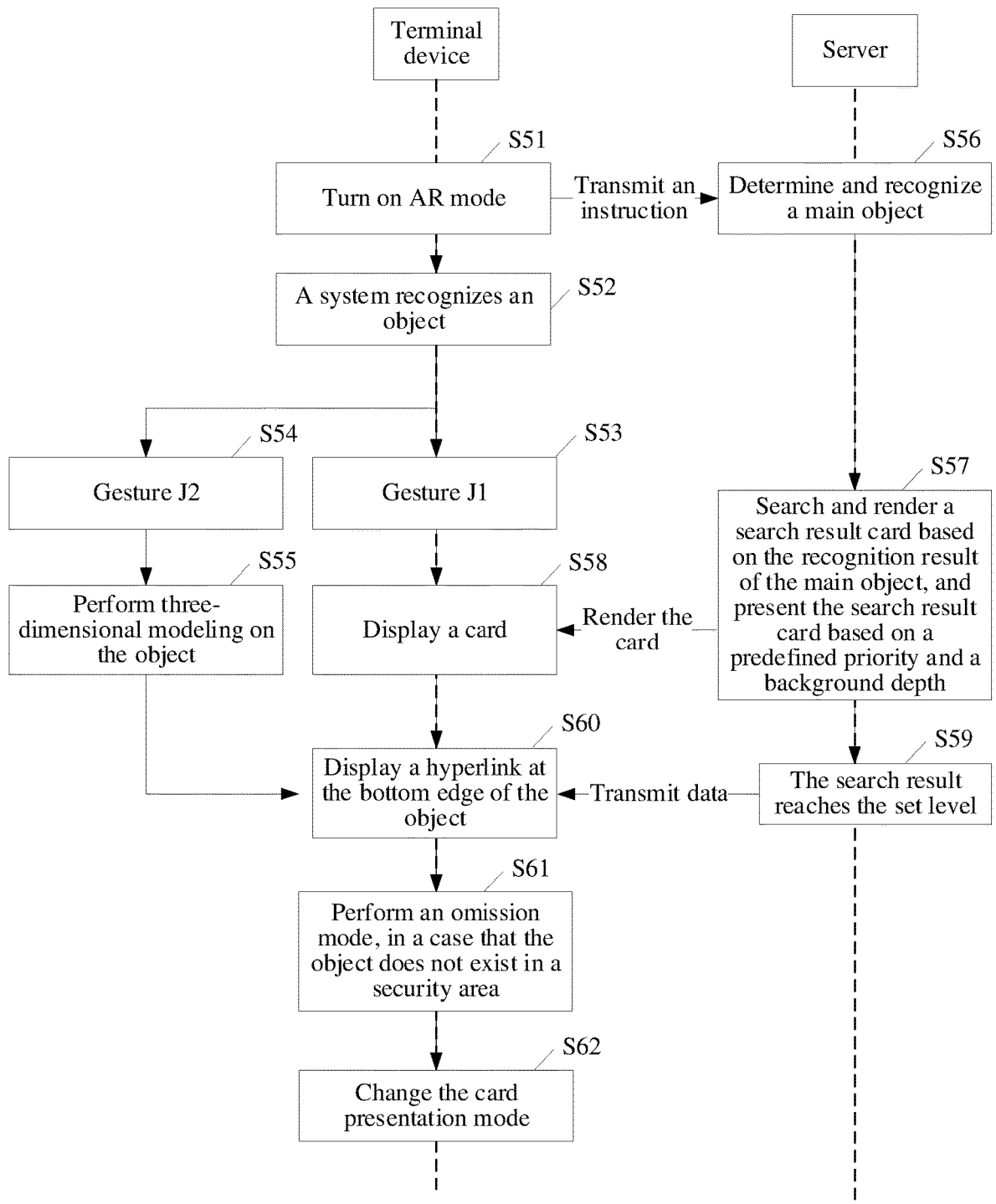
FIG. 15 is a flowchart of performing data interaction provided in an embodiment of this application.

To facilitate understanding, the specific flow of the data interaction between the terminal device and the server in the embodiments of this application may refer to FIG. 15. FIG. 15 is a flowchart of performing data interaction provided in an embodiment of this application. As shown in FIG. 15, the embodiments of this application may be performed jointly by the terminal device (i.e., a terminal presentation) and the server (i.e., a background technology). The flowchart may include steps S51-S62, and the implementation order of the steps in steps S51-S62 is not defined herein.

As shown in FIG. 15, at the beginning of the flowchart, the terminal device may perform step S51. In step S51, the terminal device turns on the AR mode and then performs step S52. The shot picture is captured by step S52, i.e., the system recognizes the object. The terminal device may transmit an instruction (including the shot picture) to the server by the shot picture to enable the server to perform step S56 and obtain a main object (namely, an object) in the shot picture by determination and recognition in step S506.

As shown in FIG. 15, the terminal device may perform step S53. In step S53, the terminal device responds to a gesture operation $J_1$ performed by the interactive object for the object identified by the system, and then transmits the trigger trajectory corresponding to the gesture operation $J_1$ to the server such that the server performs step S57 based on the trigger trajectory. In step S57, the server may search and render a search result card based on the recognition result of the main object, and present the search result card based on a predefined priority and a background depth.

As shown in FIG. 15, the terminal device may receive the search result card returned by the server in step S57 and render and display the search result card in the shooting interface by step S58. In addition, after the terminal device recognizes the object in step S52, the terminal device may perform step S54. In S54, the terminal device responds to a gesture operation $J_2$ performed by the interactive object for the shooting interface, and then performs three-dimensional modeling on the object in the shot picture by the gesture operation $J_2$ to obtain a three-dimensional model.

As shown in FIG. 15, after step S58, the server may perform step S59 to determine whether the search result corresponding to the object reaches a set level, and return the determination result corresponding to step S59 to the terminal device. When the search result corresponding to the object reaches the set level, the object in the shooting interface satisfies the hyperlink display condition, and the terminal device may perform step S60 and display the hyperlink identification at the bottom of the object by step S60. For example, when the search result corresponding to the object does not reach the set level, the object in the shooting interface does not satisfy the hyperlink display condition, and the terminal device does not need to perform step S60.

As shown in FIG. 15, after step S55, the server may perform step S59 and determine whether the search result corresponding to the object reaches the set level, and return the determination result corresponding to step S59 to the terminal device. When the object corresponding to the three-dimensional model in the shooting interface satisfies the hyperlink display condition, the terminal device may perform step S60 and display the hyperlink identification at the bottom of the three-dimensional model by step S60.

As shown in FIG. 15, the terminal device may perform step S61. In step S61, the terminal device determines whether an object exists in a secure area. If the object does not exist in the security area (namely, the object is located in the edge area), the omission mode and step S62 are performed. In step S62, the card presentation mode is changed, and the hidden identification for the object is displayed in the shooting interface.

It can be seen therefrom that in the embodiments of this application, when a shot picture is captured by a shooting component, a first trigger operation for the shooting interface is combined with the shot picture, a target object in the shot picture indicated by a first trigger operation is determined, and then an object classification of the target object is determined. Search processing is performed on the target object based on the object classification of the target object. Media data obtained after the search processing is performed on the object classification of the target object is displayed in a first virtual rendering area of the target object. As such, the interaction with the shot picture is realized, and the interaction mode of the computer device increases. It can be understood that for the first trigger operation for target objects in the shot picture, the first virtual rendering area of the target objects is displayed in the shooting interface, thereby increasing the presentation way of the computer device. In addition, in the embodiments of this application, it does not need to actively input a search keyword (namely, object classification) in the search engine, and the target object in the shot picture is determined by the first trigger operation. Namely, search processing for the target object is quickly and accurately achieved by the first trigger operation, improving the search efficiency of the target object and the search experience of the interactive object.

Figure 16:
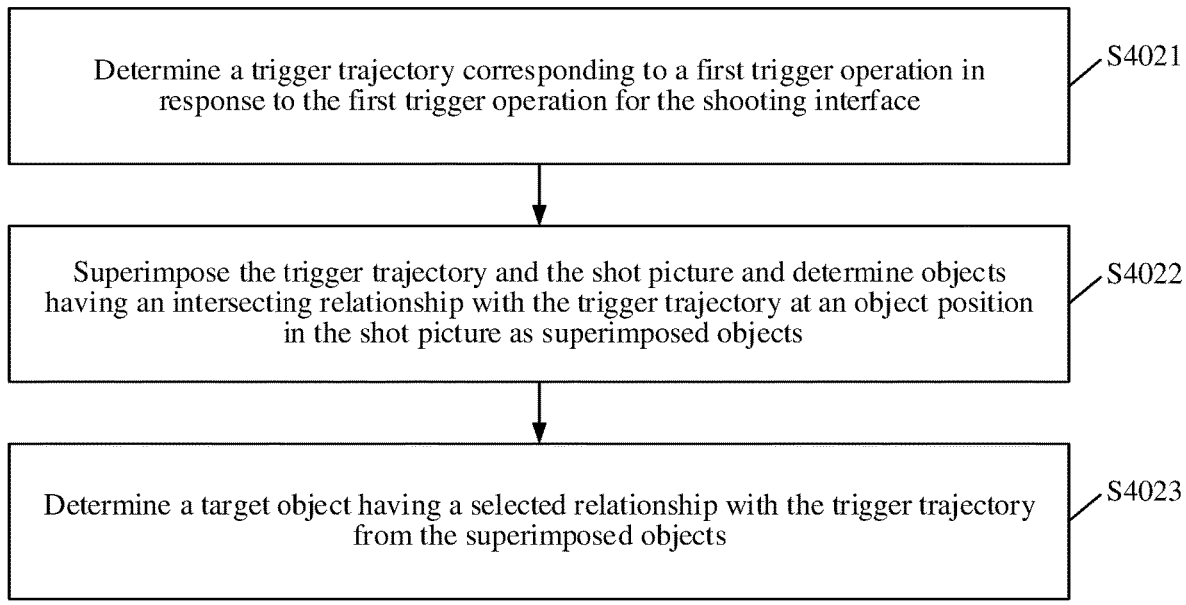
FIG. 16 is a flowchart of a data processing method provided in an embodiment of this application.

Reference may be made to FIG. 16. FIG. 16 is a flowchart of a data processing method provided in an embodiment of this application. The data processing method may include the following steps S4021-S4023, and steps S4021-S4023 is a specific embodiment of step S402 in the embodiment corresponding to FIG. 13.

Step S4021: Determine a trigger trajectory corresponding to a first trigger operation in response to the first trigger operation for the shooting interface.

The specific process that the computer device responds to the first trigger operation for the shooting interface and acquires the trigger trajectory corresponding to the first trigger operation may refer to the above description of step S402 in the embodiment corresponding to FIG. 13, which will not be described in detail herein.

Step S4022: Superimpose the trigger trajectory and the shot picture and determine objects having an intersecting relationship with the trigger trajectory at an object position in the shot picture as superimposed objects.

At least one object may be included in the shot picture, and each object corresponds to a respective object position. The computer device may superimpose and display the trigger trajectory on the object in the shot picture. When there is an intersection (namely, an intersecting relationship) between the trigger trajectory and the object position of the object, the objects having an intersecting relationship with the trigger trajectory is determined as the superimposed objects.

Step S4023: Determine the target object having a selected relationship with the trigger trajectory from the superimposed objects.

When the number of the superimposed objects is one, the computer device may directly determine the superimposed object as the target object having a selected relationship with the trigger trajectory. When the number of the superimposed objects is at least two, the computer device may determine the target object having a selected relationship with the trigger trajectory from at least two superimposed objects. It is understood that the embodiments of this application are described by taking an example that at least two superimposed objects are two superimposed objects, the specific process that the computer device determines the target object having a selected relationship with the trigger trajectory from the two superimposed objects may refer to the following embodiments corresponding to FIG. 17a, FIG. 17b, FIG. 17c, FIG. 17d, and FIG. 17e.

It is understood that the computer device may display an object selecting area associated with at least two of the superimposed objects and display candidate options separately corresponding to each of the superimposed objects in the object selecting area when the number of the superimposed objects is at least two. The computer device may take a candidate option selected by a selecting operation as a target option in response to the selecting operation for the candidate option and determine a superimposed object corresponding to the target option as the target object having a selected relationship with the trigger trajectory.

Figure 17A:
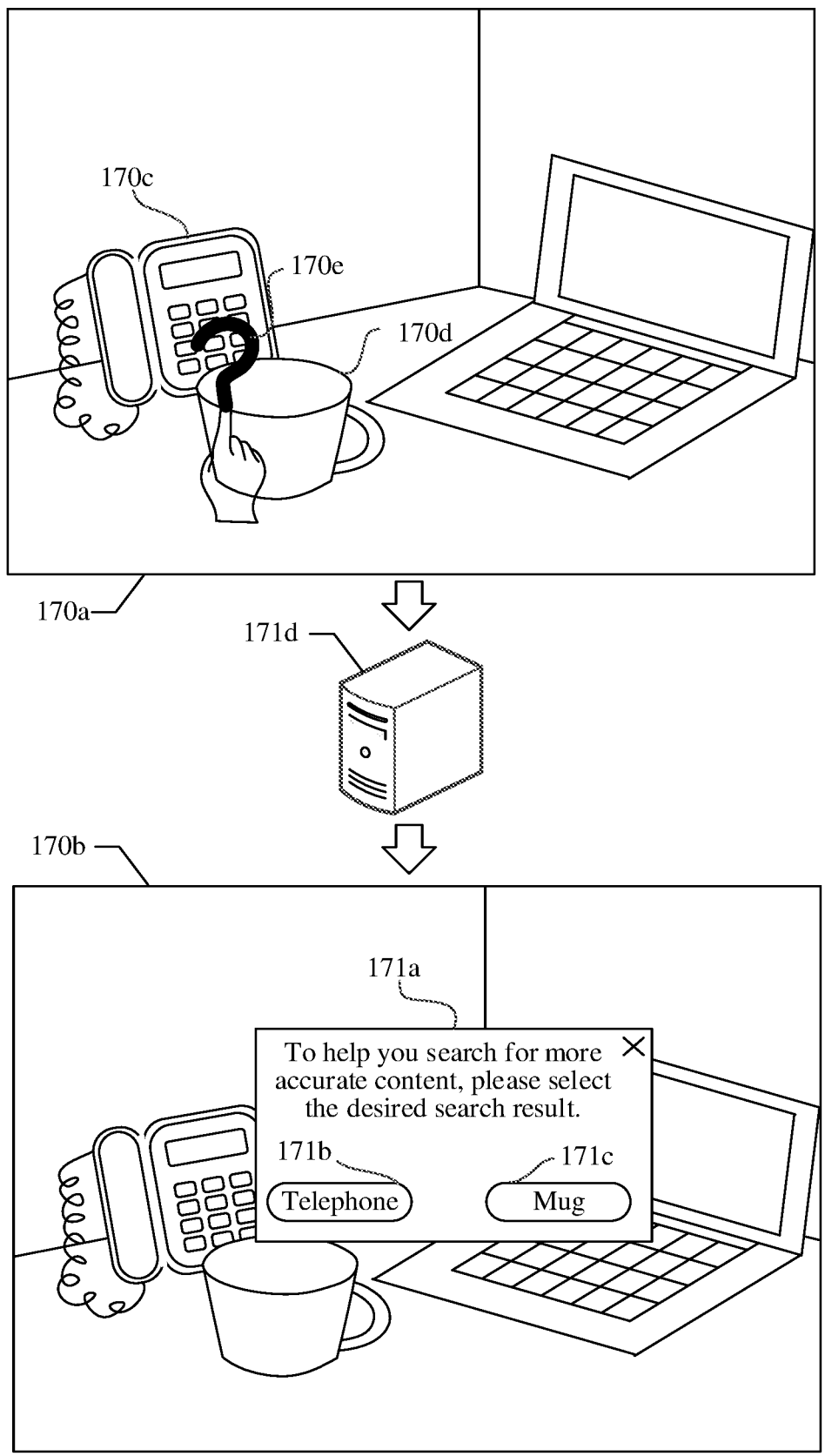
FIG. 17a is a schematic illustration of a scene for displaying a candidate option provided in an embodiment of this application.

To facilitate understanding, reference may be made to FIG. 17a. FIG. 17a is a schematic illustration of a scene for displaying a candidate option provided in an embodiment of this application. As shown in FIG. 17a, the terminal device may display a shooting interface 170a, and the shooting interface 170a may include an object 170c and an object 170d. The terminal device, in response to a first trigger operation for the object 170c and the object 170d, may acquire a trigger trajectory 170e of the first trigger operation and transmit the trigger trajectory 170e to a server 171d.

In this way, the server 171d may determine at least two superimposed objects having an intersecting relationship with the trigger trajectory 170e. The at least two superimposed objects herein may be the object 170c and the object 170d, and then candidate options separately corresponding to the object 170c and the object 170d are returned to the terminal device. As shown in FIG. 17a, the terminal device may display an object selecting area 171a associated with the object 170c and the object 170d in the shooting interface 170a, display the object selecting area 171a in the shooting interface 170b, and separately display the candidate options corresponding to the object 170c and the object 170d and prompt information associated with the candidate options in the object selecting area 171a. The candidate option corresponding to the object 170c may be a candidate option 171b, and the candidate option corresponding to the object 170d may be a candidate option 171c. The candidate option 171b and the candidate option 171c may represent object classifications of the object 170c and the object 170d. That is to say, the candidate option 171b may represent a "telephone", and the candidate option 171c may represent a "mug". The prompt information associated with the candidate option may be: "to help you search for more accurate content, please select the desired search result".

The terminal device may take a candidate option corresponding to a selecting operation as a target option in response to the selecting operation for the candidate option 171b and the candidate option 171c. For example, when the interactive object needs to read the search result corresponding to the "telephone", the selecting operation may be performed for the candidate option 171b, and at this time, the server may determine the object 170c as the target object having a selected relationship with the trigger trajectory 170e. For another example, when the interactive object needs to read the search result corresponding to the "mug", the selecting operation may be performed for the candidate option 171c, and at this time, the server may determine the object 170d as the target object having a selected relationship with the trigger trajectory 170e.

It is understood that the computer device may determine contact ratios between the trigger trajectory and each of the superimposed objects separately, acquire a superimposed object with the maximum contact ratio from at least two of the superimposed objects, and determine the superimposed object with the maximum contact ratio as the target object having a selected relationship with the trigger trajectory when the number of the superimposed objects is at least two.

The embodiments of this application are not limited to the calculation way of the contact ratio. For example, if the superimposed area between the trigger trajectory and the superimposed object and the sum of the areas of the trigger trajectory and the superimposed object are obtained, then the contact ratio between the trigger trajectory and the superimposed object is the ratio of the superimposed area to the sum of the areas. If the superimposed area between the trigger trajectory and the superimposed object and an imaging area between the trigger trajectory and the superimposed object (the sum of the areas of the trigger trajectory and the superimposed object, and the difference value between the trigger trajectory and the superimposed area) are acquired, then the contact ratio between the trigger trajectory and the superimposed object is the ratio of the superimposed area to the imaging area; the contact ratio between the trigger trajectory and the superimposed object is the superimposed area between the trigger trajectory and the superimposed object.

Figure 17B:
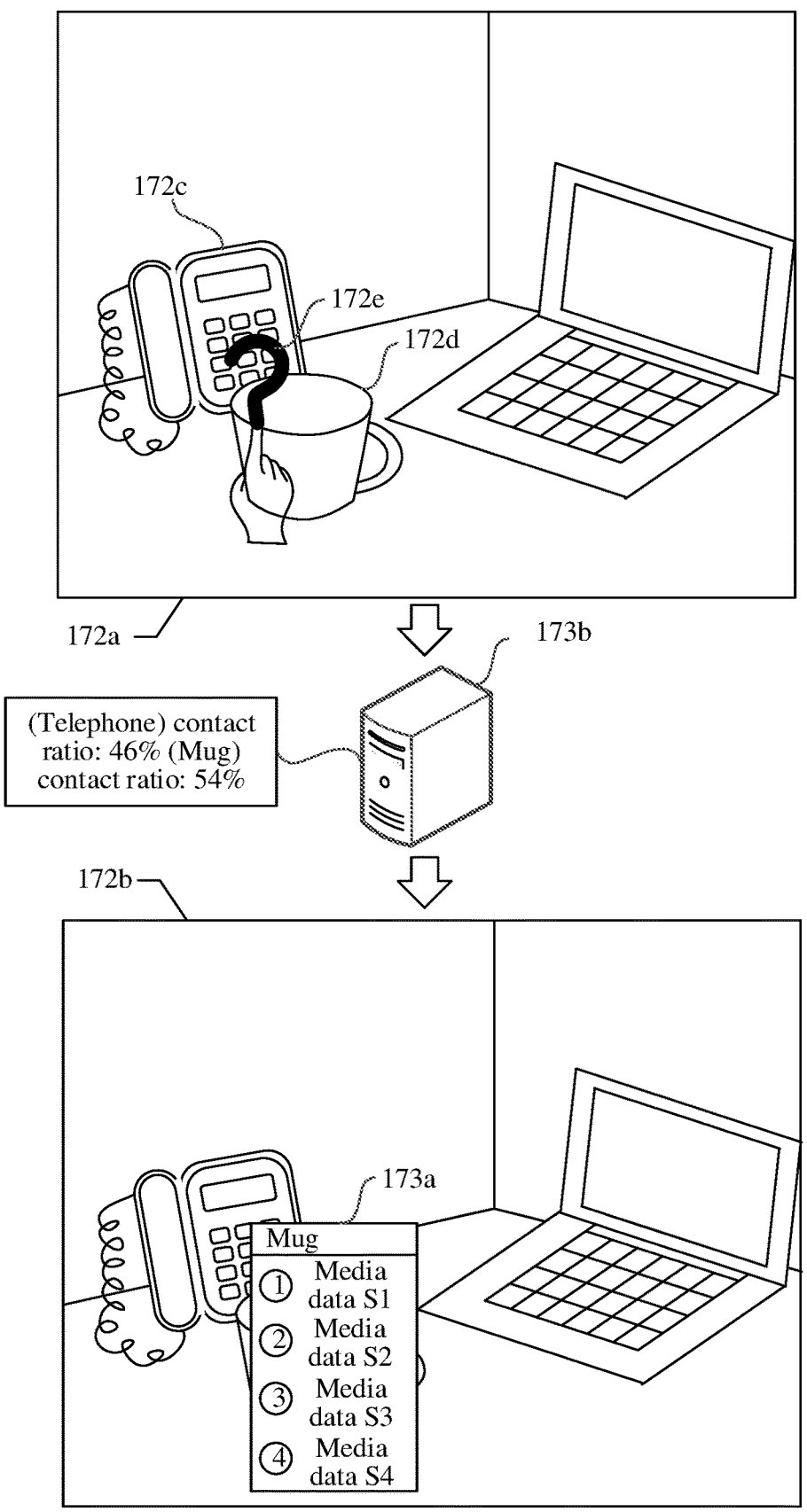
FIG. 17b is a schematic illustration of a scene for determining a contact ratio provided in an embodiment of this application.

To facilitate understanding, reference may be made to FIG. 17b. FIG. 17b is a schematic illustration of a scene for determining a contact ratio provided in an embodiment of this application. As shown in FIG. 17b, the terminal device may display a shooting interface 172a, and the shooting interface 172a may include an object 172c and an object 172d. The terminal device, in response to a first trigger operation for the object 172c and the object 172d, may acquire a trigger trajectory 172e corresponding to the first trigger operation and transmit the trigger trajectory 172e to a server 173b.

In this way, the server 172b may determine at least two superimposed objects having an intersecting relationship with the trigger trajectory 172e. The at least two superimposed objects herein may be the object 172c and the object 172d, and then the contact ratios between the trigger trajectory 172e and the object 172c and the object 172d are separately determined. For example, the contact ratio between the trigger trajectory 172e and the object 172c (the object classification corresponding to the object 172c may be the "telephone") may be 46%, and the contact ratio between the trigger trajectory 172e and the object 172d (the object classification corresponding to the object 172d may be the "mug") may be 54%.

The server may obtain the superimposed object with the greatest contact ratio from the object 172c and the object 172d. The superimposed object with the greatest contact ratio may be the object 172d because 54% is greater than 46%. At this time, the server may determine the object 172d as the target object having a selected relationship with the trigger trajectory 172e and display the first virtual rendering area 173a of the object 172d in the shooting interface 172b.

It is understood that when the number of the superimposed objects is at least two, the computer device may determine at least two superimposed objects as the target object having a selected relationship with the trigger trajectory.

Figure 17C:
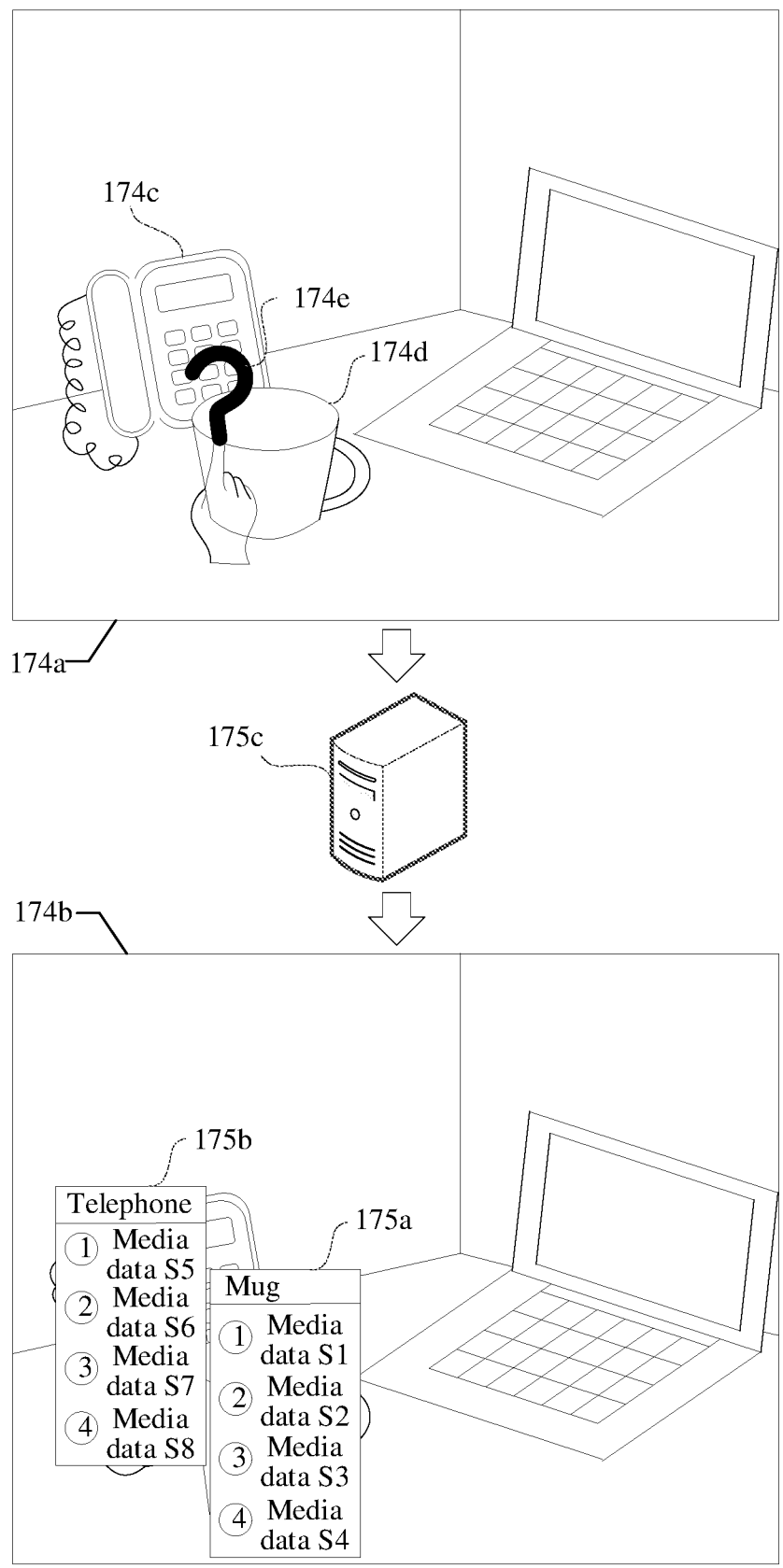
FIG. 17c is a schematic illustration of a scene for displaying a virtual rendering area provided in an embodiment of this application.

To facilitate understanding, reference may be made to FIG. 17c. FIG. 17c is a schematic illustration of a scene for displaying a virtual rendering area provided in an embodiment of this application. As shown in FIG. 17c, the terminal device may display a shooting interface 174a, and the shooting interface 174a may include an object 174c and an object 174d. The terminal device, in response to a first trigger operation for the object 174c and the object 174d, may acquire a trigger trajectory 174e corresponding to the first trigger operation and transmit the trigger trajectory 174e to a server 175c.

Thus, the server 175c may determine at least two superimposed objects having an intersecting relationship with the trigger trajectory 174e. The at least two superimposed objects herein may be the object 174c and the object 174d, and then both the object 174c and the object 174d are determined as the target objects having a selected relationship with the trigger trajectory 174e. In addition, the first virtual rendering area 175b of the object 174c and the first virtual rendering area 175a of the object 174d are simultaneously displayed in the shooting interface 174b.

The first virtual rendering area 175b may include one presentation card, and one presentation card includes four pieces of media data; the first virtual rendering area 175a may include one presentation card, and one presentation card includes four pieces of media data. For example, the terminal device may also present four pieces of media data corresponding to the first virtual rendering area 175b by four presentation cards; the terminal device may also present four pieces of media data corresponding to the first virtual rendering area 175a by four presentation cards.

In some embodiments, the terminal device may further determine the target object having a selected relationship with the trigger trajectory by an AI model. The AI model herein may be a thermal analysis model and may also be a matching analysis model. It is understood that the model types of the thermal analysis model and the matching analysis model are not defined in the embodiments of this application.

It is understood that the computer device may input at least two of the superimposed objects into a thermal analysis model and perform thermal analysis processing on at least two of the superimposed objects by the thermal analysis model to obtain thermal probabilities separately corresponding to each of the superimposed objects when the number of the superimposed objects is at least two. The computer device may determine a superimposed object with the maximum thermal probability of the at least two of the superimposed objects as the target object having a selected relationship with the trigger trajectory.

The embodiments of this application may perform thermal analysis processing on at least two superimposed objects by the thermal analysis model. The thermal analysis model is obtained by training based on the historical superimposed objects and annotation data of the historical thermal probability. The structural form of the thermal analysis model is not defined in the embodiments of this application, for example, the thermal analysis model may be a convolutional neural network model, a recurrent neural network model, a deep neural network model, and the like.

Figure 17D:
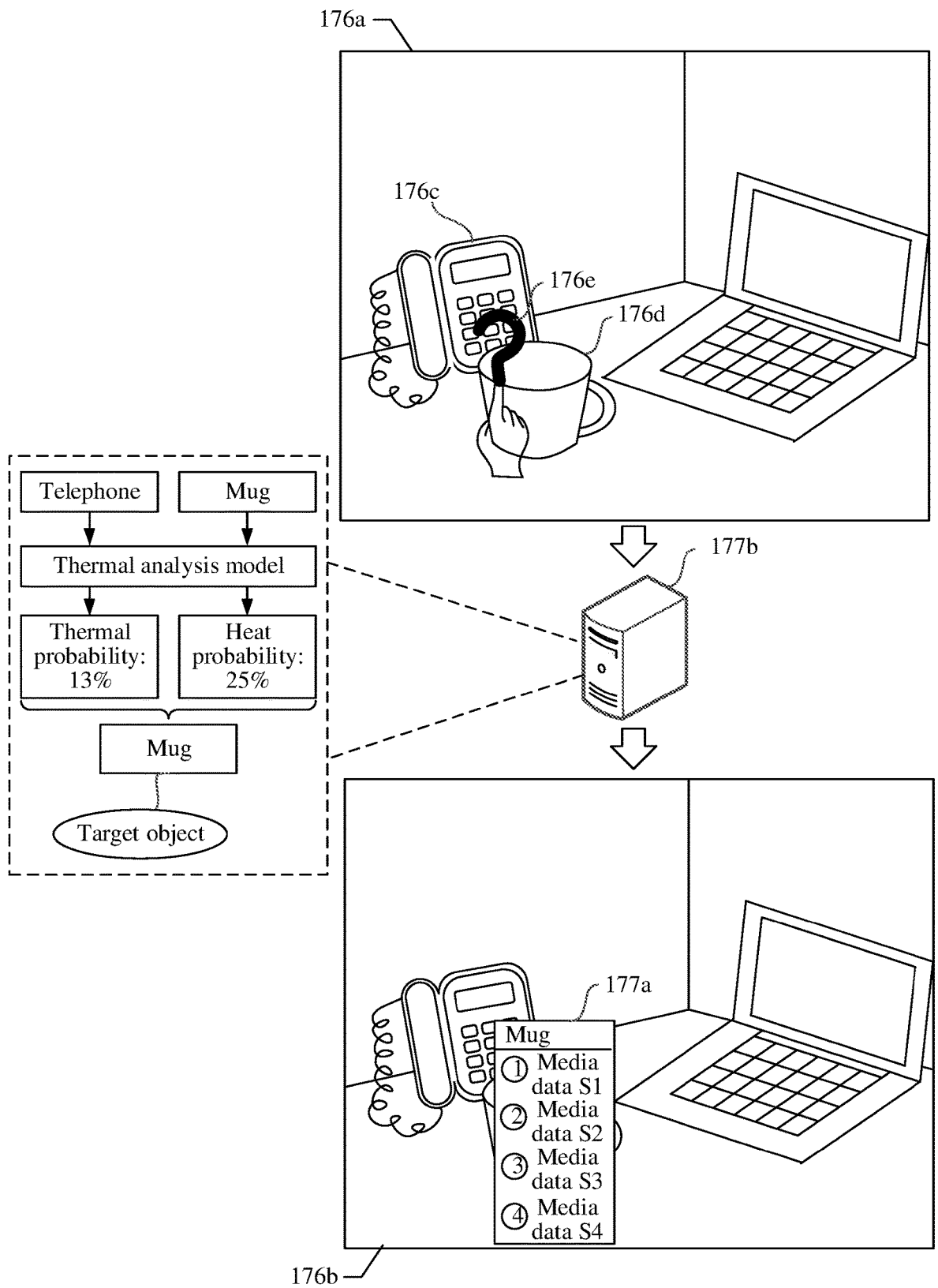
FIG. 17d is a schematic illustration of a scene for determining a thermal probability provided in an embodiment of this application.

To facilitate understanding, reference may be made to FIG. 17d. FIG. 17d is a schematic illustration of a scene for determining a thermal probability provided in an embodiment of this application. As shown in FIG. 17d, the terminal device may display a shooting interface 176a, and the shooting interface 176a may include an object 176c and an object 176d. The terminal device, in response to a first trigger operation for the object 176c and the object 176d, may acquire a trigger trajectory 176e corresponding to the first trigger operation and transmit the trigger trajectory 176e to a server 177b.

In this way, the server 177b may determine at least two superimposed objects having an intersecting relationship with the trigger trajectory 176e. The at least two superimposed objects herein may be the object 176c and the object 176d, and then the object 176c and the object 176d are inputted into the thermal analysis model. Besides, the thermal probabilities corresponding to the object 176c and the object 176d are outputted by the thermal analysis model. For example, the thermal probability corresponding to the object 176c (the object classification for the object 176c may be the "telephone") may be 13%, and the thermal probability corresponding to the object 176d (the object classification for the object 176d may be the "mug") may be 25%.

The server may obtain the superimposed object with the greatest thermal probability from the object 176c and the object 176d. The superimposed object with the greatest thermal probability is the object 176d because 25% is greater than 13%. At this time, the server may determine the object 176d as the target object having a selected relationship with the trigger trajectory 176e and display the first virtual rendering area 177a of the object 176d in the shooting interface 176b.

It is understood that when the computer device may input at least two of the superimposed objects to a matching analysis model and perform attribute and feature matching analysis processing on at least two of the superimposed objects and an interactive object by the matching analysis model to obtain attribute matching degrees between the interactive object and each of the superimposed objects separately when the number of the superimposed objects is at least two. The interactive object refers to an object to start the shooting component to acquire the shot picture. The computer device may determine a superimposed object with the maximum attribute matching degree of the at least two of the superimposed objects as the target object having a selected relationship with the trigger trajectory.

The attribute matching degree represents the similarity degree between the object attribute of the interactive object and the object attribute of the superimposed object. The object attribute of the interactive object represents the attributes such as the author who meets the interactive object's interest, the read media data, and the clicked object. The object attribute of the superimposed object represents the attributes such as the name and the object classification of the superimposed object.

The embodiment of this application may perform attribute and feature matching analysis processing on at least two superimposed objects and the interactive object by the matching analysis model. The matching analysis model is obtained by training based on the historical superimposed objects, the historical interactive object, and annotation data of historical attribute matching degree. The structural form of the matching analysis model is not defined in the embodiments of this application, for example, the matching analysis model may be a convolutional neural network model, a recurrent neural network model, a deep neural network model, and the like.

Figure 17E:
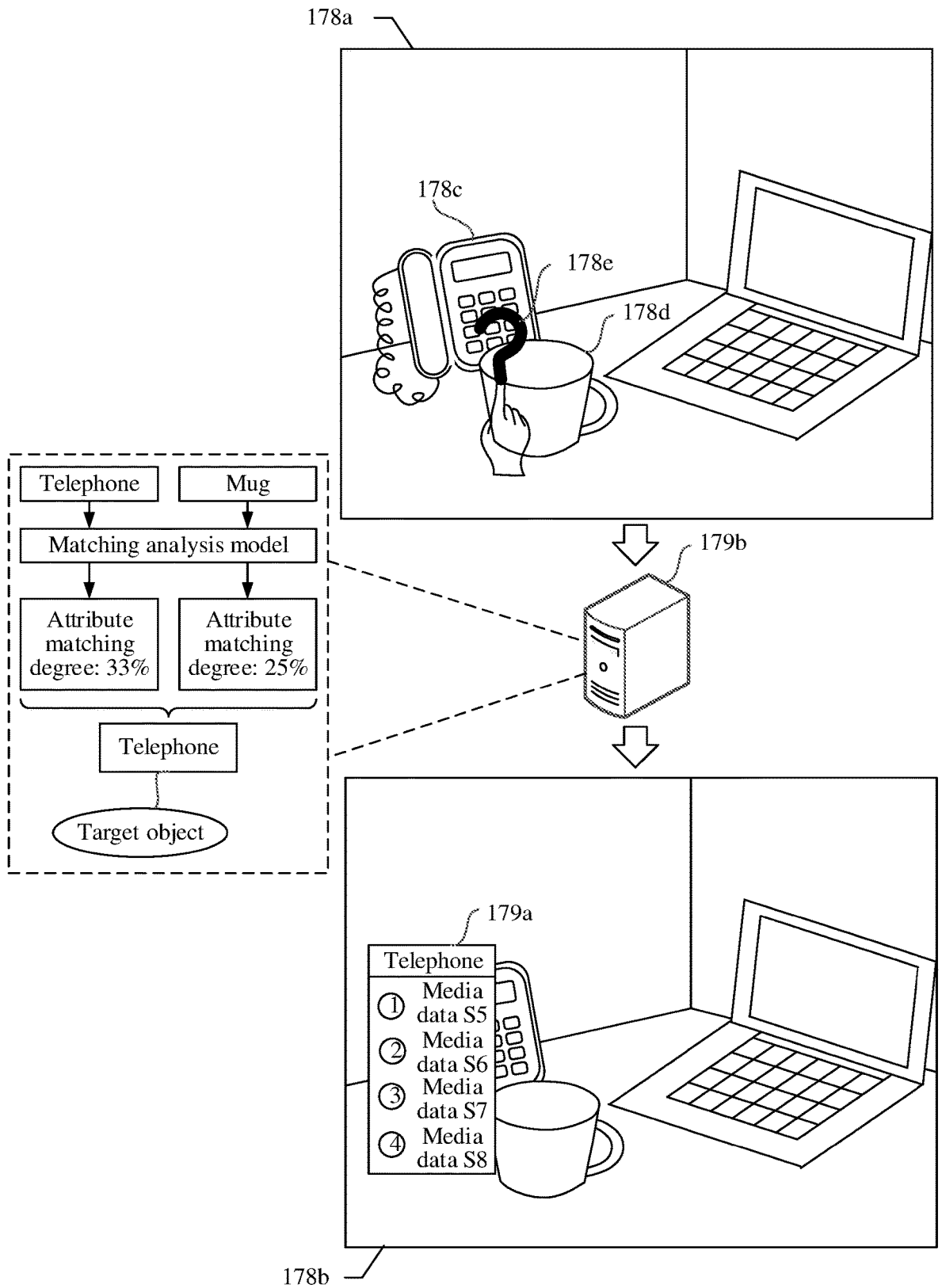
FIG. 17e is a schematic illustration of a scene for determining an attribute matching degree provided in an embodiment of this application.

To facilitate understanding, reference may be made to FIG. 17e. FIG. 17e is a schematic illustration of a scene for determining an attribute matching degree provided in an embodiment of this application. As shown in FIG. 17e, the terminal device may display a shooting interface 178a, and the shooting interface 178a may include an object 178c and an object 178d. The terminal device, in response to a first trigger operation for the object 178c and the object 178d, may acquire a trigger trajectory 178e corresponding to the first trigger operation and transmit the trigger trajectory 178e to a server 179b.

In this way, the server 179b may determine at least two superimposed objects having an intersecting relationship with the trigger trajectory 178e. The at least two superimposed objects herein may be the object 178c and the object 178d, and then the object 178c and the object 178d are inputted into the matching analysis model. Besides, the attribute matching degree between the interactive object and the object 178c and the object 178d are separately outputted by the matching analysis model. For example, the attribute matching degree between the interactive object and the object 178c (the object classification corresponding to the object 178c may be the "telephone") may be 33%, and the attribute matching degree between the interactive object and the object 178d (the object classification corresponding to the object 178d may be the "mug") may be 25%.

The server may obtain the superimposed object with the greatest attribute matching degree from the object 178c and the object 178d. The superimposed object with the greatest attribute matching degree is the object 178c because 33% is greater than 25%. At this time, the server may determine the object 178c as the target object having a selected relationship with the trigger trajectory 178e and display the first virtual rendering area 179a of the object 178c in the shooting interface 178b.

It can be seen therefrom that in the embodiments of this application, a trigger trajectory corresponding to a first trigger operation is acquired in response to the first trigger operation for the shooting interface. Then the trigger trajectory and the shot picture are superimposed, and a target object having a selected relationship with the trigger trajectory is determined from the shot picture. There is a superimposed relationship between the trigger trajectory and a plurality of objects in the shot picture. In the embodiments of this application, the target object may be determined from the plurality of objects according to various methods, improving the diversity and accuracy of determining the target object.

Figure 18:
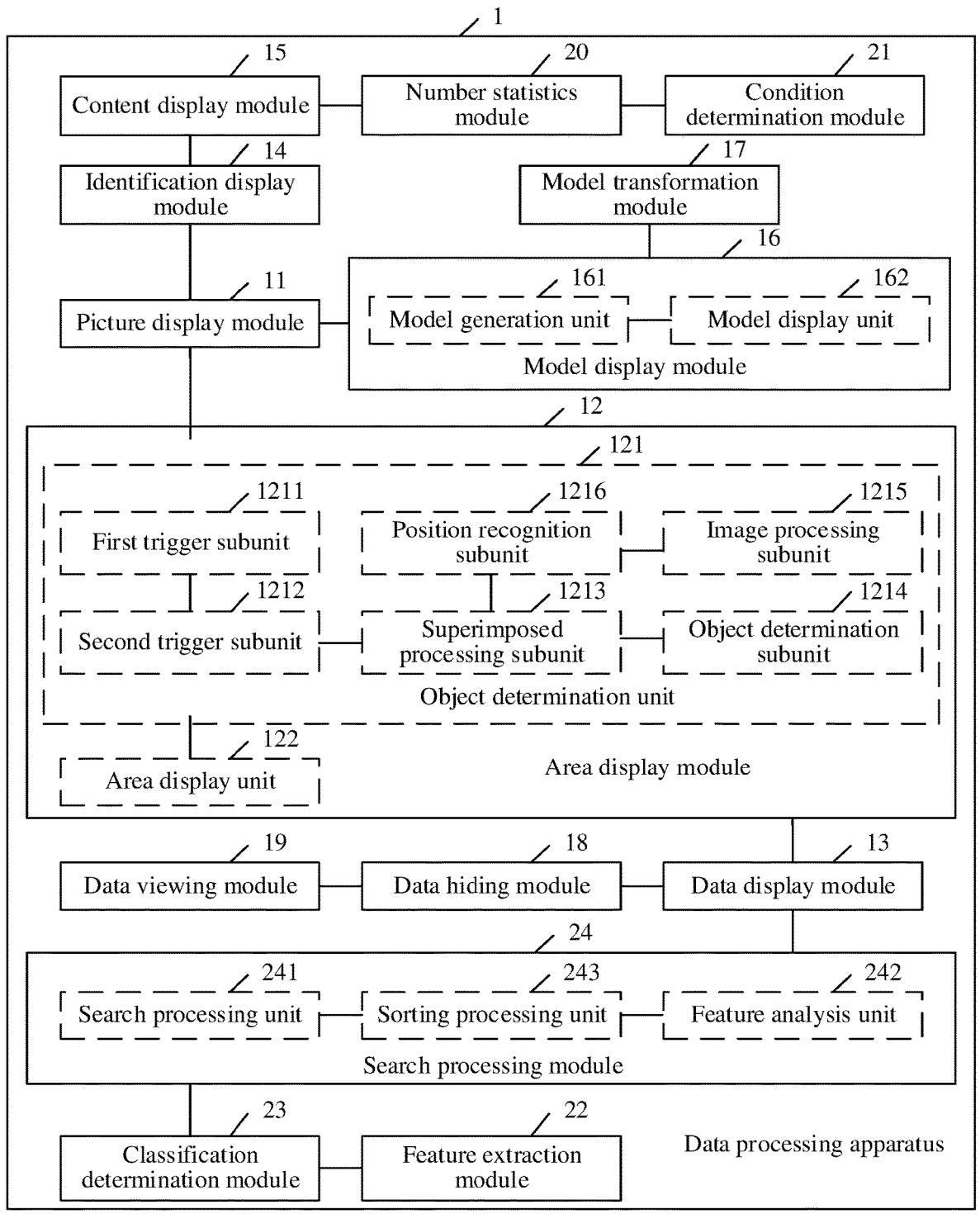
FIG. 18 is a schematic structural diagram of a data processing apparatus provided in an embodiment of this application.

With reference to FIG. 18, FIG. 18 is a schematic structural diagram of a data processing apparatus provided in an embodiment of this application. The data processing apparatus 1 may include: a picture display module 11, an area display module 12, and a data display module 13. The data processing apparatus 1 may further include: an identification display module 14, a content display module 15, a model display module 16, a model transformation module 17, a data hiding module 18, a data viewing module 19, a number statistics module 20, a condition determination module 21, a feature extraction module 22, a classification determination module 23, and a search processing module 24.

A picture display module 11 is configured to display a shot picture in a shooting interface, the shot picture being captured by a shooting component and including a target object.

An area display module 12 is configured to display a first virtual rendering area of the target object in the shooting interface in response to a first trigger operation for the target object in the shooting interface.

The area display module 12 is further configured to determine a target position of the target object in the shooting interface in response to the first trigger operation for the target object in the shooting interface. The area display module 12 is further configured to display the first virtual rendering area of the target object in the shooting interface in a focus presentation way when the target position is located in a focus area in the shooting interface. The area display module 12 is further configured to display the first virtual rendering area of the target object in the shooting interface in a non-focus presentation way when the target position is not located in the focus area in the shooting interface.

The area display module 12 is further configured to determine that the number of cards of presentation cards of the target object is M in response to the first trigger operation for the target object in the shooting interface, the number of cards being determined based on the number of media of the media data and the M being a positive integer. The area display module 12 is further configured to determine the M presentation cards as the first virtual rendering area of the target object and display the first virtual rendering area in the shooting interface.

The first trigger operation includes a voice trigger operation. The area display module 12 is further configured to acquire audio data corresponding to the voice trigger operation in response to the voice trigger operation for the shooting interface and determine an object as the target object when there is the object matching voice text data indicated by the audio data in the shot picture. The area display module 12 is further configured to display the first virtual rendering area of the target object in the shooting interface.

The area display module 12 includes: an object determination unit 121 and an area display unit 122.

The object determination unit 121 is configured to determine a trigger trajectory corresponding to a first trigger operation in response to the first trigger operation for the shooting interface and determine an object having a selected relationship with the trigger trajectory in the shot picture as a target object.

The object determination unit 121 includes: a first trigger subunit 1211, a second trigger subunit 1212, a superimposed processing subunit 1213, and an object determination subunit 1214. For example, the object determination unit 121 may further include: an image processing subunit 1215 and a position recognition subunit 1216.

The first trigger subunit 1211 is configured to determine the trigger trajectory corresponding to the first trigger operation in response to the first trigger operation of a trigger object when the trigger object displayed in the shooting interface is captured by a shooting component. Alternatively, the second trigger subunit 1212 is configured to determine the trigger trajectory of the first trigger operation on a screen in response to the first trigger operation for the screen corresponding to the shooting interface.

The superimposed processing subunit 1213 is configured to superimpose the trigger trajectory and the shot picture and determine objects having an intersecting relationship with the trigger trajectory at an object position in the shot picture as superimposed objects. The object determination subunit 1214 is configured to determine the target object having a selected relationship with the trigger trajectory from the superimposed objects.

The object determination subunit 1214 is further configured to display an object selecting area associated with at least two of the superimposed objects and display candidate options separately corresponding to each of the superimposed objects in the object selecting area when the number of the superimposed objects is at least two. The object determination subunit 1214 is further configured to take a candidate option selected by a selecting operation as a target option in response to the selecting operation for the candidate option and determine a superimposed object corresponding to the target option as the target object having a selected relationship with the trigger trajectory.

The object determination subunit 1214 is further configured to determine contact ratios between the trigger trajectory and each of the superimposed objects separately, acquire a superimposed object with the maximum contact ratio from at least two of the superimposed objects, and determine the superimposed object with the maximum contact ratio as the target object having a selected relationship with the trigger trajectory when the number of the superimposed objects is at least two.

The object determination subunit 1214 is further configured to input at least two of the superimposed objects into a thermal analysis model and perform thermal analysis processing on at least two of the superimposed objects by the thermal analysis model to obtain thermal probabilities separately corresponding to each of the superimposed objects when the number of the superimposed objects is at least two. The object determination subunit 1214 is further configured to determine a superimposed object with the maximum thermal probability of the at least two of the superimposed objects as the target object having a selected relationship with the trigger trajectory.

The object determination subunit 1214 is further configured to input at least two of the superimposed objects to a matching analysis model and perform attribute and feature matching analysis processing on at least two of the superimposed objects and an interactive object by the matching analysis model to obtain attribute matching degrees between the interactive object and each of the superimposed objects separately when the number of the superimposed objects is at least two, the interactive object being an object for starting a shooting component to acquire the shot picture. The object determination subunit 1214 is further configured to determine a superimposed object with the maximum attribute matching degree of the at least two of the superimposed objects as the target object having a selected relationship with the trigger trajectory.

For example, the image processing subunit 1215 is configured to perform image pre-processing on shot image data in the shot picture to obtain pre-processed image data. The image processing subunit 1215 is configured to perform object edge detection on the pre-processed image data to obtain a set of object edge nodes of the pre-processed image data, the set of the object edge nodes including edge nodes in the pre-processed image data. The position recognition subunit 1216 is configured to recognize the object position in the shot picture based on the edge nodes in the set of the edge nodes.

The specific implementations of the first trigger subunit 1211, the second trigger subunit 1212, the superimposed processing subunit 1213 and the object determination subunit 1214 may refer to the descriptions of step S402 in the embodiment corresponding to FIG. 13 and steps S4021-S4023 in the embodiment corresponding to FIG. 16, which will not be described in detail herein. The specific implementations of the image processing subunit 1215 and the position recognition subunit 1216 may refer to the description of step S402 in the above embodiment corresponding to FIG. 13, which will not be described in detail herein.

The area display unit 122 is configured to display the first virtual rendering area of the target object in the shooting interface.

The specific implementations of the object determination unit 121 and the area display unit 122 may refer to the descriptions of step S102 in the embodiment corresponding to FIG. 3, step S402 and step S407 in the embodiment corresponding to FIG. 13, and steps S4021-S4023 in the embodiment corresponding to FIG. 16, which will not be described in detail herein.

The data display module 13 is configured to display media data in the first virtual rendering area, the media data being associated with an object classification of the target object.

For example, the identification display module 14 is configured to display a hyperlink identification associated with the target object at an area in which the target object in the shooting interface is located when the target object in the shooting interface satisfies a hyperlink display condition, the hyperlink identification being associated with target media data in the media data. The content display module 15 is configured to display a second virtual rendering area of the target object in the shooting interface in response to a second trigger operation for the target object indicated by the hyperlink identification. The content display module 15 is configured to display a media presentation content corresponding to the target media data in the second virtual rendering area.

For example, the model display module 16 is configured to display a virtual model object having a same shape as a target object in the shooting interface in response to a modeling operation for the target object in the shooting interface.

The model display module 16 includes: a model generation unit 161 and a model display unit 162.

The model generation unit 161 is configured to determine depth information indicated by the shot picture in response to the modeling operation for the target object in the shooting interface, map the target object in the shot picture onto a three-dimensional space based on the depth information, and generate the virtual model object having the same shape as the target object in the three-dimensional space. The model display unit 162 is configured to display the virtual model object at a position in which the target object in the shooting interface is located, the virtual model object being displayed over the target object.

The specific implementations of the model generation unit 161 and the model display unit 162 may refer to the description of step S301 in the above embodiment corresponding to FIG. 10, which will not be described in detail herein.

The model transformation module 17 is configured to display the virtual model object at a virtual position in the shooting interface in response to a transformation operation for the virtual model object in the shooting interface, the virtual position being a transformation position indicated by the transformation operation.

For example, the data hiding module 18 is configured to acquire a target update position of a target object in the updated shot picture in the shooting interface when the shot picture is updated. The data hiding module 18 is configured to hide the first virtual rendering area and the media data and display a hidden identification for the target object in the shooting interface when the target update position is located in an edge area in the shooting interface. The data viewing module 19 is configured to redisplay the first virtual rendering area including the media data in the shooting interface in response to a check operation of the hidden identification for the target object.

For example, the number statistics module 20 is configured to count a distribution number and a trigger number of the target media data in a target time period and determine a ratio between the distribution number and the trigger number as a trigger probability of the target media data. The condition determination module 21 is configured to determine that the target object satisfies the hyperlink display condition when the trigger number is greater than a number threshold value, and the trigger probability is greater than a probability threshold value.

For example, the feature extraction module 22 is configured to perform object enhancement on the target object in the shooting interface to obtain an enhanced object. The feature extraction module 22 is configured to perform image feature extraction processing on the enhanced object to obtain an enhanced image feature and perform text feature extraction processing on the enhanced object to obtain an enhanced text feature. The classification determination module 23 is configured to perform feature fusion processing on the enhanced image feature and the enhanced text feature to obtain an enhanced fusion feature and determine an object classification of the target object based on the enhanced fusion feature. The search processing module 24 is configured to input the object classification to a search engine and perform search processing on the object classification by the search engine to obtain the media data for being displayed in the first virtual rendering area.

The search processing module 24 includes: a search processing unit 241, a feature analysis unit 242, and a sorting processing unit 243.

The search processing unit 241 is configured to input the object classification to the search engine and perform the search processing on the object classification by the search engine to obtain a set of the media data associated with the object classification. The feature analysis unit 242 is configured to acquire historical trigger information corresponding to an interactive object and perform a feature analysis on the historical trigger information to obtain a historical object feature of the interactive object, the interactive object referring to an object to start the shooting component to acquire the shot picture. The sorting processing unit 243 is configured to sort the media data in the set of the media data based on the historical object feature and acquire the media data for being displayed in the first virtual rendering area from the sorted media data.

The specific implementations of the search processing unit 241, the feature analysis unit 242, and the sorting processing unit 243 may refer to the description of step S406 in the above embodiment corresponding to FIG. 13, which will not be described in detail herein.

The specific implementations of the picture display module 11, the area display module 12, and the data display module 13 may refer to the descriptions of steps S101-S103 in the embodiment corresponding to FIG. 3, steps S401-S402 and steps S407-S408 in the embodiment corresponding to FIG. 13, and steps S4021-S4023 in the embodiment corresponding to FIG. 16, which will not be described in detail herein. The specific implementations of the identification display module 14, the content display module 15, the number statistics module 20, and the condition determination module 21 may refer to the descriptions of steps S201-S205 in the above embodiment corresponding to FIG. 7, which will not be described in detail herein. The specific implementations of the model display module 16 and the model transformation module 17 may refer to the descriptions of steps S301-S302 in the above embodiment corresponding to FIG. 10, which will not be described in detail herein. The specific implementations of the data hiding module 18 and the data viewing module 19 may refer to the description of step S103 in the above embodiment corresponding to FIG. 3, which will not be described in detail herein. The specific implementations of the feature extraction module 22, the classification determination module 23, and the search processing module 24 may refer to the descriptions of steps S403-S406 in the above embodiment corresponding to FIG. 3, which will not be described in detail herein. In addition, the advantageous effects using the same method will not be described in detail.

Figure 19:
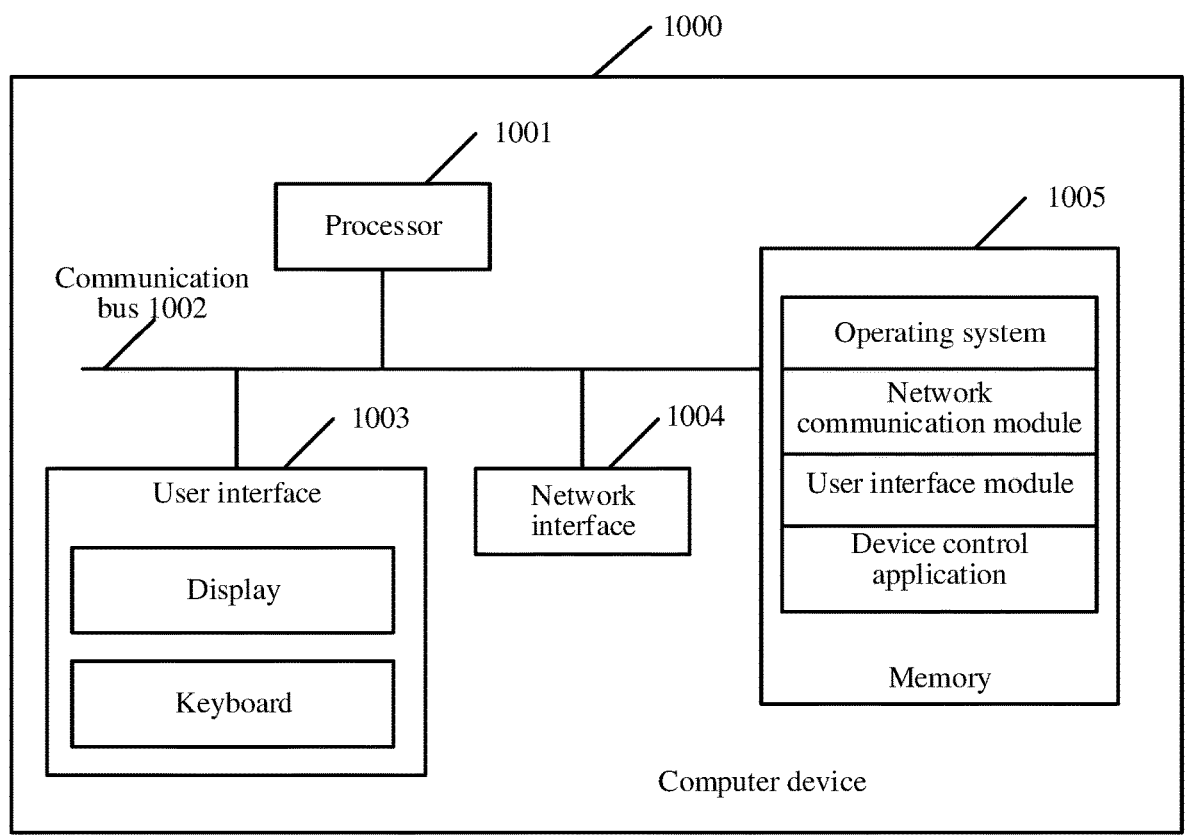
FIG. 19 is a schematic structural diagram of a computer device provided in an embodiment of this application.

Reference may be made to FIG. 19. FIG. 19 is a schematic structural diagram of a computer device provided in an embodiment of this application. As shown in FIG. 19, the computer device 1000 may include: a processor 1001, a network interface 1004, and a memory 1005. In addition, the above computer device 1000 may further include: a user interface 1003 and at least one communication bus 1002. The communication bus 1002 is configured to enable connection and communication of these components. In some embodiments, the user interface 1003 may include a display and a keyboard. The alternative user interface 1003 may also include standard wired and wireless interfaces. For example, the network interface 1004 may include standard wired and wireless interfaces (e.g., a WI-FI interface). The memory 1005 may be either a high-speed RAM or a non-volatile memory, such as at least one disk memory. For example, the memory 1005 may also be at least one storage apparatus away from the above processor 1001. As shown in FIG. 19, as a computer-readable storage medium, the memory 1005 may include an operating system, a network communication module, a user interface module, and a device control application.

In the computer device 1000 as shown in FIG. 19, the network interface 1004 may provide a network communication function. The user interface 1003 is mainly configured to provide an interface for a user to input. The processor 1001 may be configured to recall the device control application stored in the memory 1005 to realize:

display a shot picture in a shooting interface, the shot picture being captured by a shooting component and including a target object;

display a first virtual rendering area of the target object in the shooting interface in response to a first trigger operation for the target object in the shooting interface; and display media data in the first virtual rendering area, the media data being associated with an object classification of the target object.

It is understood that the computer device 1000 as described in the embodiments of this application may carry out the description of the data processing method as described in the embodiments corresponding to FIG. 3, FIG. 7, FIG. 10, FIG. 13, and FIG. 16, and may also carry out the description of the data processing apparatus 1 as described in the embodiment corresponding to FIG. 18, which will not be described in detail herein. In addition, the advantageous effects using the same method will not be described in detail.

Furthermore, the embodiments of this application also provide a computer-readable storage medium, storing a computer program executed by the above data processing apparatus 1 therein. The computer program includes program instructions, when executed by a processor, being capable of performing the description of the data processing method in the embodiments corresponding to FIG. 3, FIG. 7, FIG. 10, FIG. 13, and FIG. 16, which will not be described in detail herein. In addition, the advantageous effects using the same method will not be described in detail. For technical details not disclosed in the embodiments of the computer-readable storage medium in this application, reference may be made to the description of the method embodiments of this application.

An embodiment of this application further provides a computer program product and a computer program, and the computer program product or the computer program may include a computer instruction stored in a computer-readable storage medium. The processor of the computer device reads the computer instruction from the computer-readable storage medium, and the processor may execute the computer instruction to cause the computer device to perform the description of the data processing method in the embodiments corresponding to FIG. 3, FIG. 7, FIG. 10, FIG. 13, and FIG. 16, which will not be described in detail herein. In addition, the advantageous effects using the same method will not be described in detail. For technical details not disclosed in the embodiments of the computer program product or the computer program in this application, reference may be made to the description of the method embodiments of this application.

It can be understood that, the embodiments of this application relate to the user data, including the historical trigger information. When the embodiments of this application are applied to a specific product or technology, it is necessary to obtain the user's permission or consent, and the collection, use and processing of the relevant data comply with the relevant laws, regulations and standards of the relevant countries and regions.

It will be appreciated by those skilled in the art that the implementation of all or part of the flows in the above method embodiments can be completed by instructing the relevant hardware by the computer program. The computer program can be stored in a computer readable storage medium. When executed, the program can include the flows in the embodiments of the above methods. The storage medium may be a magnetic disk, an optical disk, a Read-Only Memory (ROM), a Random Access Memory (RAM), and the like.

The above disclosure is merely an exemplary embodiment of this application. It is not intended to limit the scope of the claims of this application, and therefore equivalent variations according to the claims of this application are within the scope of this application.

What is claimed is:

1. A data processing method, applied to a computer device having one or more processors and memory storing programs to be executed by the one or more processors, the method comprising:
   displaying a shot picture in a shooting interface, the shot picture being captured by a shooting component and comprising a target object;
   displaying a first virtual rendering area of the target object in the shooting interface in response to a first trigger operation for the target object in the shooting interface;
   displaying media data in the first virtual rendering area, the media data being associated with an object classification of the target object;
   acquiring a target update position of the target object in an updated shot picture in the shooting interface when the shot picture is updated;
   hiding the first virtual rendering area and the media data and displaying a hidden identification for the target object in the shooting interface when the target update position is located in an edge area in the shooting interface; and
   redisplaying the first virtual rendering area comprising the media data in the shooting interface in response to a check operation of the hidden identification for the target object.

2. The method according to claim 1, wherein displaying a first virtual rendering area of the target object in the shooting interface in response to a first trigger operation for the target object in the shooting interface comprises:
   determining a target position of the target object in the shooting interface in response to the first trigger operation for the target object in the shooting interface;
   displaying the first virtual rendering area of the target object in the shooting interface in a focus presentation way when the target position is located in a focus area in the shooting interface; and
   displaying the first virtual rendering area of the target object in the shooting interface in a non-focus presentation way when the target position is not located in the focus area in the shooting interface.

3. The method according to claim 1, wherein displaying a first virtual rendering area of the target object in the shooting interface in response to a first trigger operation for the target object in the shooting interface comprises:
   determining a number of M presentation cards of the target object in response to the first trigger operation for the target object in the shooting interface, the number of M presentation cards being determined based on a number of the media data and M being a positive integer; and
   determining the M presentation cards as the first virtual rendering area of the target object and displaying the first virtual rendering area in the shooting interface.

4. The method according to claim 1, further comprising:
   displaying a hyperlink identification associated with the target object at an area in which the target object in the shooting interface is located when the target object in the shooting interface satisfies a hyperlink display condition, the hyperlink identification being associated with target media data in the media data;
   displaying a second virtual rendering area of the target object in the shooting interface in response to a second trigger operation for the target object indicated by the hyperlink identification; and
   displaying a media presentation content corresponding to the target media data in the second virtual rendering area.

5. The method according to claim 4, further comprising:
   counting a distribution number and a trigger number of the target media data in a target time period and determining a ratio between the distribution number and the trigger number as a trigger probability of the target media data; and
   determining that the target object satisfies the hyperlink display condition when the trigger number is greater than a number threshold value, and the trigger probability being greater than a probability threshold value.

6. The method according to claim 1, further comprising:
   displaying a virtual model object having a same shape as the target object in the shooting interface in response to a modeling operation for the target object in the shooting interface; and
   displaying the virtual model object at a virtual position in the shooting interface in response to a transformation operation for the virtual model object in the shooting interface, the virtual position being a transformation position indicated by the transformation operation.

7. The method according to claim 6, wherein displaying a virtual model object having a same shape as the target object in the shooting interface in response to a modeling operation for the target object in the shooting interface comprises:
   determining depth information indicated by the shot picture in response to the modeling operation for the target object in the shooting interface, mapping the target object in the shot picture onto a three-dimensional space based on the depth information, and generating the virtual model object having the same shape as the target object in the three-dimensional space; and
   displaying the virtual model object at a position in which the target object in the shooting interface is located, the virtual model object being displayed over the target object.

8. The method according to claim 1, wherein
the first trigger operation comprises a voice trigger operation, and
displaying a first virtual rendering area of the target object in the shooting interface in response to a first trigger operation for the target object in the shooting interface comprises:
   acquiring audio data corresponding to the voice trigger operation in response to the voice trigger operation for the shooting interface and determining an object as the target object when the object has a matching relationship with voice text data indicated by the audio data in the shot picture; and displaying the first virtual rendering area of the target object in the shooting interface.

9. The method according to claim 1, wherein displaying a first virtual rendering area of the target object in the shooting interface in response to a first trigger operation for the target object in the shooting interface comprises:

determining a trigger trajectory corresponding to the first trigger operation in response to the first trigger operation for the shooting interface and determining an object having a selected relationship with the trigger trajectory in the shot picture as the target object; and displaying the first virtual rendering area of the target object in the shooting interface.

10. The method according to claim 9, wherein determining a trigger trajectory corresponding to the first trigger operation in response to the first trigger operation for the shooting interface comprises:

determining the trigger trajectory corresponding to the first trigger operation in response to the first trigger operation of a trigger object when the trigger object displayed in the shooting interface is captured by a shooting component; or determining the trigger trajectory of the first trigger operation on a screen in response to the first trigger operation for the screen corresponding to the shooting interface.

11. The method according to claim 9, wherein the determining an object having a selected relationship with the trigger trajectory in the shot picture as the target object comprises:

superimposing the trigger trajectory and the shot picture and determining objects having an intersecting relationship with the trigger trajectory at an object position in the shot picture as superimposed objects; and determining the target object having a selected relationship with the trigger trajectory from the superimposed objects.

12. The method according to claim 11, wherein determining the target object having a selected relationship with the trigger trajectory from the superimposed objects comprises:

displaying an object selecting area associated with at least two of the superimposed objects and displaying candidate options separately corresponding to each of the superimposed objects in the object selecting area when a number of the superimposed objects is at least two; and taking a candidate option selected by a selecting operation as a target option in response to the selecting operation for the candidate option and determining a superimposed object corresponding to the target option as the target object having a selected relationship with the trigger trajectory.

13. The method according to claim 11, wherein determining the target object having a selected relationship with the trigger trajectory from the superimposed objects comprises:

determining contact ratios between the trigger trajectory and each of the superimposed objects separately, acquiring a superimposed object with the maximum contact ratio from at least two of the superimposed objects, and determining the superimposed object with the maximum contact ratio as the target object having a selected relationship with the trigger trajectory when a number of the superimposed objects is at least two.

14. The method according to claim 11, wherein determining the target object having a selected relationship with the trigger trajectory from the superimposed objects comprises:

inputting at least two of the superimposed objects into a thermal analysis model and performing thermal analysis processing on at least two of the superimposed objects by the thermal analysis model to obtain thermal probabilities separately corresponding to each of the superimposed objects when a number of the superimposed objects is at least two; and determining a superimposed object with the maximum thermal probability of the at least two of the superimposed objects as the target object having a selected relationship with the trigger trajectory.

15. The method according to claim 11, wherein determining the target object having a selected relationship with the trigger trajectory from the superimposed objects comprises:

inputting at least two of the superimposed objects to a matching analysis model and performing attribute and feature matching analysis processing on at least two of the superimposed objects and an interactive object by the matching analysis model to obtain attribute matching degrees between the interactive object and each of the superimposed objects separately when a number of the superimposed objects is at least two, the interactive object being an object for starting a shooting component to acquire the shot picture; and determining a superimposed object with the maximum attribute matching degree of the at least two of the superimposed objects as the target object having a selected relationship with the trigger trajectory.

16. The method according to claim 11, wherein before determining objects having an intersecting relationship with the trigger trajectory at an object position in the shot picture as superimposed objects, the method further comprises:

performing image pre-processing on shot image data in the shot picture to obtain pre-processed image data;

performing object edge detection on the pre-processed image data to obtain a set of object edge nodes of the pre-processed image data, the set of the object edge nodes comprising edge nodes in the pre-processed image data; and recognizing the object position in the shot picture based on the edge nodes in the set of the edge nodes.

17. The method according to claim 1, wherein before the displaying media data in the first virtual rendering area, the method further comprises:

performing object enhancement on the target object in the shooting interface to obtain an enhanced object;

performing image feature extraction processing on the enhanced object to obtain an enhanced image feature and performing text feature extraction processing on the enhanced object to obtain an enhanced text feature;

performing feature fusion processing on the enhanced image feature and the enhanced text feature to obtain an enhanced fusion feature and determining an object classification of the target object based on the enhanced fusion feature; and inputting the object classification to a search engine and performing search processing on the object classification by the search engine to obtain the media data for being displayed in the first virtual rendering area.

18. A computer device comprising one or more processors, memory coupled to the one or more processors and a plurality of programs stored in the memory that, when executed by the one or more processors, cause the computing device to perform a plurality of operations comprising:

displaying a shot picture in a shooting interface, the shot picture being captured by a shooting component and comprising a target object;
displaying a first virtual rendering area of the target object in the shooting interface in response to a first trigger operation for the target object in the shooting interface;
displaying media data in the first virtual rendering area, the media data being associated with an object classification of the target object;
acquiring a target update position of the target object in an updated shot picture in the shooting interface when the shot picture is updated;
hiding the first virtual rendering area and the media data and displaying a hidden identification for the target object in the shooting interface when the target update position is located in an edge area in the shooting interface; and
redisplaying the first virtual rendering area comprising the media data in the shooting interface in response to a check operation of the hidden identification for the target object.

19. A non-transitory computer-readable storage medium, storing a computer program therein, the computer program configured to, when executed by a processor of a computer device, to cause the computer device to:
display a shot picture in a shooting interface, the shot picture being captured by a shooting component and comprising a target object;
display a first virtual rendering area of the target object in the shooting interface in response to a first trigger operation for the target object in the shooting interface;
display media data in the first virtual rendering area, the media data being associated with an object classification of the target object;
acquiring a target update position of the target object in an updated shot picture in the shooting interface when the shot picture is updated;
hiding the first virtual rendering area and the media data and displaying a hidden identification for the target object in the shooting interface when the target update position is located in an edge area in the shooting interface; and
redisplaying the first virtual rendering area comprising the media data in the shooting interface in response to a check operation of the hidden identification for the target object.

* * * * *

UNITED STATES PATENT AND TRADEMARK OFFICE
CERTIFICATE OF CORRECTION

| | | |
|---|---|---|
| PATENT NO. | : 11,978,170 B2 | Page 1 of 1 |
| APPLICATION NO. | : 18/210497 | |
| DATED | : May 7, 2024 | |
| INVENTOR(S) | : Rui Han | |

It is certified that error appears in the above-identified patent and that said Letters Patent is hereby corrected as shown below:

On the Title Page

Column one (1) Add:
-- (30) Foreign Application Priority Data
January 27, 2022 (CN) 202210100378.3 --

Signed and Sealed this
Fourth Day of February, 2025

Coke Morgan Stewart
*Acting Director of the United States Patent and Trademark Office*